United States Patent
Qian et al.

(10) Patent No.: US 9,811,655 B2
(45) Date of Patent: Nov. 7, 2017

(54) METHOD, APPARATUS, AND SYSTEM FOR MANAGING USER ACCOUNTS

(71) Applicant: Alibaba Group Holding Limited, George Town, KY (US)

(72) Inventors: Jianbo Qian, Hangzhou (CN); Xingjun Ni, Hangzhou (CN); Feng Yu, Hangzhou (CN)

(73) Assignee: Alibaba Group Holding Limited (KY)

(*) Notice: Subject to any disclaimer, the term of this patent is extended or adjusted under 35 U.S.C. 154(b) by 0 days.

(21) Appl. No.: 14/703,604

(22) Filed: May 4, 2015

(65) Prior Publication Data

US 2015/0324579 A1   Nov. 12, 2015

(30) Foreign Application Priority Data

May 6, 2014   (CN) .......................... 2014 1 0188430

(51) Int. Cl.
| | |
|---|---|
| *H04N 7/16* | (2011.01) |
| *G06F 17/30* | (2006.01) |
| *G06F 7/04* | (2006.01) |
| *G06F 21/45* | (2013.01) |
| *H04L 29/06* | (2006.01) |
| *G06F 21/46* | (2013.01) |

(52) U.S. Cl.
CPC .............. *G06F 21/45* (2013.01); *G06F 21/46* (2013.01); *H04L 63/083* (2013.01); *H04L 63/10* (2013.01)

(58) Field of Classification Search
CPC ....... G06F 21/45; G06F 21/46; H04L 63/083; H04L 63/10
USPC .......................................................... 726/6
See application file for complete search history.

(56) References Cited

U.S. PATENT DOCUMENTS

| | | |
|---|---|---|
| 6,701,362 B1 | 3/2004 | Subramonian et al. |
| 7,117,528 B1 | 10/2006 | Hyman et al. |
| 7,770,204 B2 | 8/2010 | Pathakis et al. |
| 7,912,762 B2 | 3/2011 | Sirota |
| 8,739,256 B2 | 5/2014 | Foell et al. |

(Continued)

FOREIGN PATENT DOCUMENTS

| | | | |
|---|---|---|---|
| KR | 20050078308 | 8/2005 | |
| KR | 1020040005691 | * 3/2011 | ........................ 726/6 |
| WO | 0152025 | 7/2001 | |

OTHER PUBLICATIONS

KaPing Yee; Passpet: Convenient Password Management and Phishing Protection; ACM: 2006; p. 1-12.*

*Primary Examiner* — Monjour Rahim
(74) *Attorney, Agent, or Firm* — Van Pelt, Yi & James LLP

(57) ABSTRACT

Embodiments of the present application relate to a method and system for managing user accounts. The method includes receiving a registration request from a current user, wherein the registration request comprises a login name main part, determining, in a database, whether a conflicting old user exists, wherein a conflicting old user corresponds to another user that has a conflicting login name main part that is the same as the login name main part received in connection with the registration request, in the event that a conflicting old user exists, executing a login password differentiation process that requires a user to register a different login password that is different from a login password associated with the conflicting old user, and storing the different login password to the database in connection with a registration of the current user.

26 Claims, 9 Drawing Sheets

(56) References Cited

U.S. PATENT DOCUMENTS

| | | | |
|---|---|---|---|
| 2004/0210776 A1* | 10/2004 | Shah | G06Q 30/02 |
| | | | 726/6 |
| 2006/0059362 A1* | 3/2006 | Paden | H04L 63/083 |
| | | | 713/184 |
| 2006/0067244 A1 | 3/2006 | Sekaran et al. | |
| 2007/0283028 A1* | 12/2007 | Gilroy | H04L 29/12066 |
| | | | 709/230 |
| 2011/0041166 A1* | 2/2011 | Mani | G06F 21/31 |
| | | | 726/6 |
| 2014/0095546 A1* | 4/2014 | Kruglikov | G06F 11/1471 |
| | | | 707/784 |
| 2014/0136704 A1 | 5/2014 | Yang et al. | |

* cited by examiner

METHOD, APPARATUS, AND SYSTEM FOR MANAGING USER ACCOUNTS

CROSS REFERENCE TO OTHER APPLICATIONS

This application claims priority to People's Republic of China Patent Application No. 201410188430.0 entitled A METHOD AND A DEVICE FOR USER ACCOUNT MANAGEMENT, filed May 6, 2014 which is incorporated herein by reference for all purposes.

FIELD OF THE INVENTION

The present application relates to a field of Internet technology. In particular, the present application relates to a method for user account management, a device relating to user account management, and a system relating to user account management.

BACKGROUND OF THE INVENTION

Currently, many applications used in connection with the Internet and traditional media-type applications require specific identities for user participation. Examples according to some related art include e-commerce and social networking applications. According to some related art, a user registers accounts in such applications. Logging in to the application (e.g., a server associated with the application) is generally realized with a login name (also called the "login ID") and a login password. In most applications, a login name is generally an alphanumeric string (such as a QQ number issued by Tencent), a nickname, or a mailbox name. In other applications, mobile phone numbers can be used as login names.

Regardless of the form of login name used in connection with an application or system associated therewith, most systems that provide a service have a control mechanism that involves the uniqueness of login names within the system. To take mobile phone number login names as an example, the problem of twice-issued numbers will lead to contradictions between the intra-system login name uniqueness control requirements and user experiences. A twice-issued number refers to the following process: after the original user of a mobile phone number cancels his account and gives up the mobile phone number, the mobile phone number is recovered by the telecommunications operator and is thereupon allocated to a new user. After a phone number has been issued a second time, the new user is faced with the problem of being unable to register specific applications with the mobile phone number. For example, the old user of a mobile phone number used the phone number to register an Alipay account. Consequently, in the event that the new user uses this mobile phone number to register an Alipay account, the Alipay service system will discover a login name conflict and can therefore temporarily refuse registration until the conflict is resolved. In addition, if the old user did not promptly change the user's contact information (e.g., an indication of the mobile phone number at which the user can be reached), then the following problem may result: a business message or a security verification message may be sent to the user's registered phone number and therefore received by the new user of the phone number. Accordingly, twice-issued phone numbers may diminish user experience and may give rise to security risks.

As the Internet evolves, the problems associated with twice-issued phone numbers are not just limited to mobile phone numbers, but can also be experienced in connection with mail boxes, QQ numbers, and other fields of technology. For example, the transfer of a QQ number can cause the QQ number to be issued twice. As another example, large-scale Webmail service providers often recover mail accounts that have long been idle and then make the recovered mail accounts available for registration by new users. Consequently, problems associated with twice-issued user identifiers (e.g., twice-issued numbers) are widespread in Internet applications.

Currently, solutions to the problem associated with twice-issued phone numbers described above rely primarily on manual handling. For example, the new user of the mobile phone number locates the manual customer service for Alipay and proves that the new user is the rightful (e.g., lawful) owner of the mobile phone number. According to some related art, customer service systems deployed in connection with an application require processing in the background to modify the mobile phone number that is still stored in the system by the original user of the mobile phone number. The customer service systems can use such processing to release the mobile phone number. Following release of the mobile phone number, the mobile phone number will no longer exist (e.g., no longer be registered with a user) in the system. Thus, use of the mobile phone number by the new user will satisfy the uniqueness control requirement. Registration of the mobile phone number in association with the new user will therefore succeed.

The current manual processing approach to resolving the problems associated with twice-issued phone numbers has significant deficiencies. First, the labor cost of such manual processing is high. In a large-scale Internet application, such as Taobao or Sina Weibo, the number of users is extremely large, and the number of twice-issued numbers is considerable. Employing a number of people required to manually process such a large number of users and twice-issued numbers to solve the problem is not cost effective. Second, the manual processing causes a poor experience for users. Manual customer service generally requires that the new user of the mobile phone number provide various pieces of evidence to prove the new user's rightful (e.g., lawful) ownership of the mobile phone number. Without a doubt, such a requirement places many additional operating requirements on users. Third, the manual processing takes a long time for manual customer service to check information and perform the processing. The user is unable to register promptly. Fourth, the issue of how to properly modify the mobile phone number in the old user's account is another problem that requires further manual effort.

BRIEF DESCRIPTION OF THE DRAWINGS

Various embodiments of the invention are disclosed in the following detailed description and the accompanying drawings.

DETAILED DESCRIPTION

Figure 1:
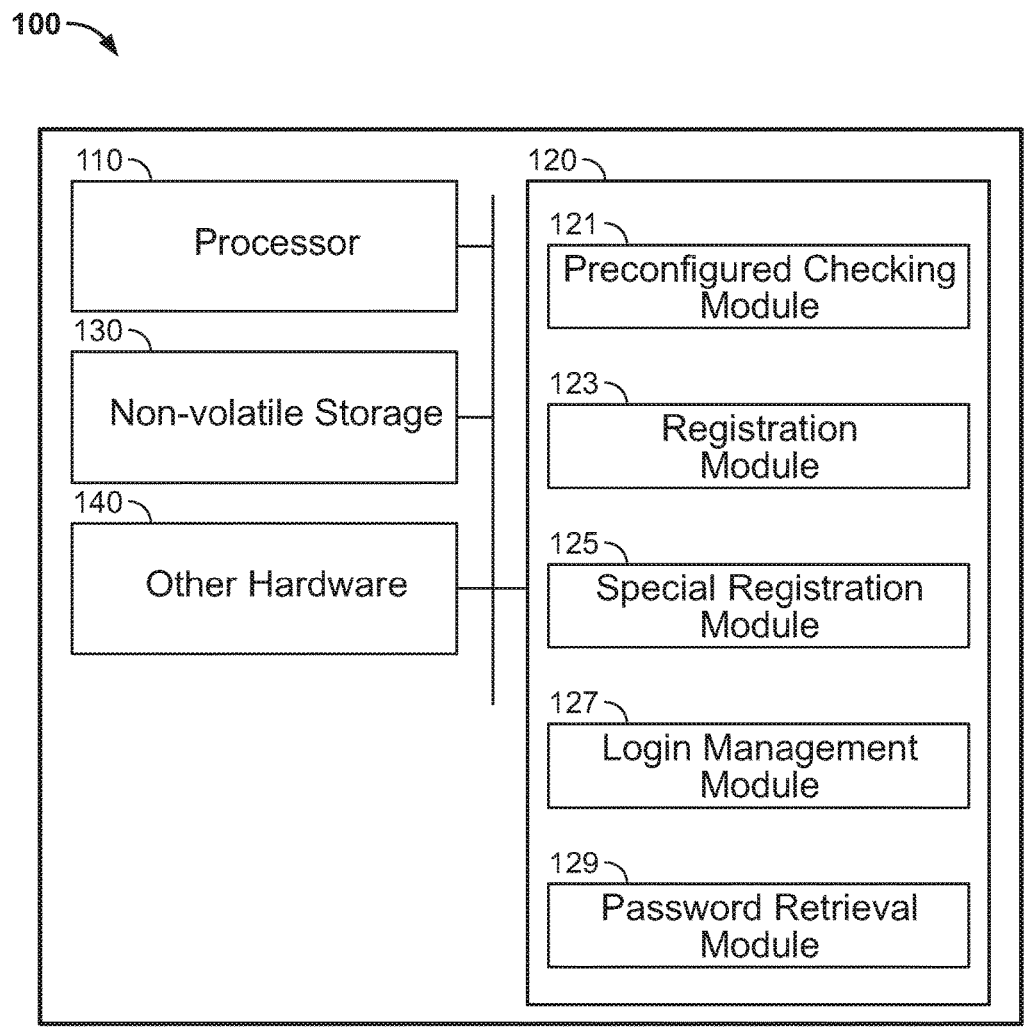
FIG. 1 is a structural block diagram of a logical structure and hardware environment of a user account management device according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of the present disclosure include a method, an apparatus, and a system for managing a user account. For example, the method, the apparatus, and the system can be used in connection with registering a user identifier, verifying a user associated with a user identifier, updating a user that is registered in association with a particular user identifier, or the like. As used herein, a user identifier can refer to a phone number (e.g., a mobile phone number), a mail box (e.g., an email account), a username, a QQ number, or the like.

A device generally refers to a device used (e.g., by a user) within a network system and used to communicate with one or more servers. According to various embodiments of the present disclosure, a device may include communication functionality. For example, a device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), or the like.

According to some embodiments of the present disclosure, a device includes a smart home appliance with communication functionality. A smart home appliance can be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like.

According to various embodiments of the present disclosure, a device can be any combination of the foregoing devices. In addition, it will be apparent to one having ordinary skill in the art that a device according to various embodiments of the present disclosure is not limited to the foregoing devices.

According to some embodiments, the problems associated with twice-issued user identifiers, namely registration conflicts and diminished user experience, are resolved, improving the way data is organized internally within the application system and the corresponding processing flow.

Referring to Table 1, in some embodiments, an account table that records the account information of every user in a system includes a login name field (e.g., field 1 of Table 1). The login name field can include one or more parameters in addition to the login name main part. The parameters can be used to ensure uniqueness of each entry in the login name field. As an example, the parameters can be used such that the data in a login name field in any account record is unique within the database table of the application system. In some embodiments, the parameters can include a conflict identification parameter. The conflict identification parameter can be used to ensure the uniqueness of login name data registered, or otherwise stored, in the login name field. In some embodiments, the login name main part of login name data registered in the login name field can be repeated (and the login name data stored in the login name field can still be unique in relation to other login name data stored in the login name field). The login name main part can correspond to a login identifier (e.g., an identifier that is entered by a user in connection with a login attempt). For example, the login identifier can be a string that includes one or more alphanumeric characters or special characters. The login identifier can correspond to a user's phone number. From the perspective of a user, the user can continue to regard the login name main part as the login name. In other words, the user need not perceive the change in the data structure of the login name field. For example, in some embodiments, the user can interface with a server of the application system using the login name main part as the login name without being required to enter, or otherwise be aware of, the parameters (e.g., the conflict identification parameter) used to ensure uniqueness of the login name data. In fact, the login name main part, which the user considers to be the login name, is actually the login name main part in the system. In some embodiments, in the system, the login name main part may be the login name data itself, or the login name main part might be just a part of the login name data.

Referring to Table 1, a first user (e.g., Kevin) can be registered in association with the user identifier (e.g., the mobile phone number) 18611180751 as a login name. In the system, the login name data in the login name field of the user account record is "18611180751." However, a second user (e.g., Tony) can also use the user identifier (e.g., the mobile phone number) 18611180751 as a login name. In the system, the login name data in the login name field of the account record for the user Tony is "18611180751|R". The character "R" included in the account record for the user Tony corresponds to a conflict identification parameter. The conflict identification parameter can be selected according to a type of conflict that exists. The conflict identification parameter can be an alphanumeric or special character. In some embodiments, the uniqueness of the login name in the system database is ensured by organizing the login name data in this way.

In some embodiments, a service that enhances the user experience of the system can be provided based on an organization of data (e.g., storing login name data to include multiple entries of a user name identifier, which is used by a user to log in to the system, with a parameter added to the user identifier to ensure uniqueness among data stored in the database). In this example, the login name field further comprises a predetermined separator character such as "|" (vertical bar), " " (space), "," (comma), etc. The predetermined separator character can be part of the one or more parameters used to ensure uniqueness. In some embodiments, the predetermined separator can serve as a demarcation between a user identifier (e.g., a login name) and the one or more parameters used to ensure uniqueness. In some embodiments, introduction (e.g., use) of the predetermined separator character takes into account business extensibility, but is not a necessary selection. For example, in the mainland China region, all mobile phone numbers have 11 digits. For service providers whose business is concentrated in the mainland China region, there is no need to introduce a separator character in the implementation process because the system can demarcate the mobile phone number from the conflict identification parameter according to the length of the mobile phone number and thereby accurately determine the mobile phone number and the conflict identification parameter. However, because the number of digits in mobile phone numbers differs between various countries/regions, service providers that serve more countries/regions can introduce a separator character between the login name main part and the conflict identification parameter to assist in differentiating between the login name main part and the conflict identification parameter.

TABLE 1

| Sequential number | Field 1<br>Login name + Separator character +<br>Identification factor | Field 2<br>Login password |
| --- | --- | --- |
| 1 | 13900100110 | aaaaaa |
| 2 | 18611180751|R | bbbbbb |
| 3 | 18611180751 | cccccc |
| 4 | 13988888888 | aaaaaa |
| ... | ... | ... |

In some embodiments, according to a software implementation that is based on the change in data organizational structure described above, a user account management device and a corresponding management method can be used.

FIG. 1 is a structural block diagram and hardware environment of a user account management device according to various embodiments of the present application.

Referring to FIG. 1, a user account management device 100 is provided. In some embodiments, the user account management device 100 is used to implement method 200 of FIG. 2. In some embodiments, the user management device 100 is used to implement interface 300 of FIG. 3A. In some embodiments, the user management device 100 is used to implement interface 350 of FIG. 3B. In some embodiments, the user management device 100 is used to implement method 400 of FIG. 4. In some embodiments, the user management device 100 is used to implement interface 500 of FIG. 5. In some embodiments, the user management device 100 is implemented in system 600 of FIG. 6.

In some embodiments, the user account management device 100 can be implemented as a logical device operating on a server. In some embodiments, the user management device 100 includes a processor 110, a memory 120, and a non-volatile storage 130. The user management device 100 can also include other hardware 140. For example, the other hardware 140 can comprise other hardware required for business services.

The processor 110 can receive the corresponding computer program (e.g., a series of instructions) from the non-volatile storage to the memory and execute the computer program. In some embodiments, the user management device 100 is implemented in the logical layer (of a server). In some embodiments, the user management device 100 can be a part of an external service of a logical system (e.g., a part of the external service of the Alipay service system). In some embodiments, the user management device 100 is implemented as a logic device or a combined software/hardware implementation. In other words, the entity that executes the process flow of the management method need not be limited to the various logical units. The management method executing entity can also be hardware or a logic device.

In some embodiments, the user management device 100 comprises a preconfigured checking module 121, a registration module 123, a special registration module 125, and a login management module 127. The user management device 100 can include a password retrieval module 129. In some embodiments, the preconfigured checking module 121, the registration module 123, the special registration module 125, the login management module 127, and the password retrieval module 129 can be implemented as a set of instructions that are stored on a memory (e.g., memory 120) and that are executable by one or more processors.

Figure 2:
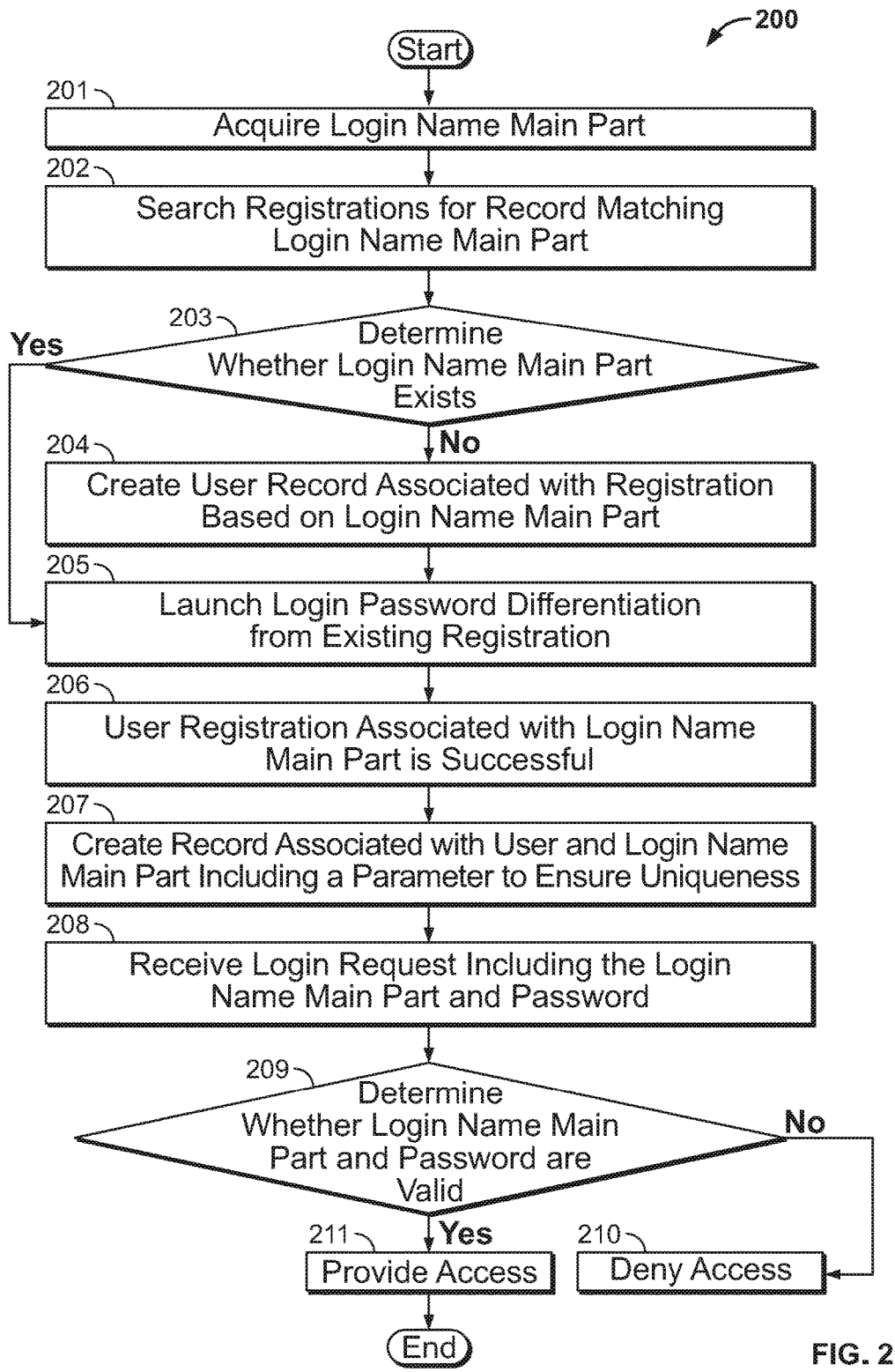
FIG. 2 is a flowchart of a method for user account management according to various embodiments of the present application.

FIG. 2 is a flowchart of a method for user account management according to various embodiments of the present application.

Referring to FIG. 2, a method 200 for user account management is provided. In some embodiments, the method 200 can be implemented by device 100 of FIG. 1. In some embodiments, the method 200 is implemented by system 600 of FIG. 6. In some embodiments, the method 200 can implement the interface 300 of FIG. 3A, the interface 350 of FIG. 3B, or the interface 360 of FIG. 3C.

At 201, a login name main part is acquired. In some embodiments, the login name main part is acquired in connection with a registration request (e.g., a request to register with an application system). A server can acquire the login name main part from a device used by a user (e.g., a user attempting to register with an application system). In some embodiments, the login name main part corresponds to a user identifier. In some embodiments, the preconfigured checking module 121 of the user management device 100 acquires the login name main part in connection with a registration request received from a current user.

At 202, registrations are searched for a record matching the login name main part. In some embodiments, the server searches the registrations (e.g., the records) for a record matching the login name main part. For example, the server can search a database for a record matching the acquired login name main part. The database can store records of user identifiers registered with an application system. In some embodiments, the database includes an account table. In the event that the registrations include the acquired login name main part, the acquired login name main part conflicts with the existing registration associated with the acquired login name main part. In the event that the registrations do not include the acquired login name main part, the acquired login name main part does not conflict with an existing registration (e.g., an existing record). In some embodiments, the preconfigured checking module 121 of the user management device 100 searches an account table for a record matching the login name main part.

At 203, a determination is made as to whether the login name main part exists in the registrations. For example, the server determines whether the registrations include an existing record matching the login name main part. In the event that the registrations include the acquired login name main part, the method 200 can proceed to 205. Otherwise, in the event that the registrations do not include the acquired login name main part, the method 200 can proceed to 204. In some embodiments, the preconfigured checking module 121 of the user management device 100 searches an account table for a record matching the login name main part to determine whether or not a conflicting old user using the login name main part exists.

At 204, a user record associated with a registration of the current user is created based on the login name main part. In some embodiments, a server creates the registration (e.g., a record) using the acquired login name main part. The registration based at least in part on the login name main part can be created in response to determining that the registrations (e.g., the database of registered users or registered user identifiers) do not include a registration (e.g., record) of the login name main part (e.g., in connection with a registration of another user). In some embodiments, the registration module 123 of the user management device 100 can create the registration relating to the acquired login name main part. The registration can include a field indicating a user identifier, a password, date of birth information, gender information, favorite number information, favorite color information, the like, or any combination thereof. The user identifier can include the login name main part, and the like. In some embodiments the registration can be stored in an account table.

At 205, a login password differentiation process can be executed. In some embodiments, a server can invoke the login password differentiation process from an existing registration process. In some embodiments, the process can create a registration based at least in part on the acquired login name main part such that the registration is differentiated from an existing registration that uses a login name main part that matches the acquired login name main part. The login password differentiation process associated with an existing registration process can be invoked, or otherwise executed, in response to determining that the registrations (e.g., the database of registered users or registered user identifiers) includes a registration (e.g., record) of the login name main part (e.g., in connection with a registration of another user). In some embodiments, the special registration module 125 of the user management device 100 is activated in response to determining that the registrations include a registration of the login name main part. The special registration module 125 of the user management device 100 can implement the login password differentiation process from an existing registration process. The special registration module 125 of the user management device 100 can activate, in response to the current user's registration request (e.g., received in connection to acquisition of the login name main part), a guided process flow for the login password differentiation process so as to guide the current user to use a login password different from the password used by a conflicting old user associated with the record matching the acquired login name main part.

At 206, user registration associated with the login name main part is determined to be successful. In some embodiments, the server can determine that user registration is successful. In some embodiments, user registration associated with the login name main part can require additional criteria, other than selection of a password that is different from the password of the conflicting old user, be satisfied before user registration is successful. For example, user registration can require that certain fields (e.g., name, address, user preferences, or the like) be completed. In some embodiments, the special registration module 125 of the user management device 100 illustrated in FIG. 1 can be implemented to determine whether the user registration associated with the login name main part is successful.

At 207, a user record associated with a registration of the acquired login name main part is created. In some embodiments, the server creates the record. The server can store the record to memory (e.g., the database of registered users or registered user identifiers). As an example, the server can store the record to a corresponding account table.

In some embodiments, the server creates a record corresponding to the user registration associated with the login name main part in response to determining that the password corresponding to the registration of the acquired login name main part is different from the password used by the conflicting old user associated with the record matching the acquired login name main part. In the event that the user registers successfully, the server can create in the account table a user record based on the login name main part in the user's registration request and the login password. The login password can be acquired contemporaneous with acquisition of the login name main part (e.g., the login password can be received as part of, or otherwise in connection with a registration request). In some embodiments, a conflict identification parameter is introduced in the login name field of the login name main part of the conflicting old user in connection with creation of the user record in the account table associated with the successful user registration. The conflict identification parameter can be generated and stored in connection with a corresponding login name main part for one or more of any login name main parts that conflict with the acquired login name main part, including the acquired login name main part in the event that the acquired login name main part is used in a successful user registration.

At 208, a login request is received. In some embodiments, the server can receive the login request. The login request can include the login name main part and a corresponding login password. In some embodiments, the login management module 127 of the user management device 100 receives the login name main part and the login password associated with the current user's login request. In the event that the login request is received, the server (e.g., the login management module 127 of FIG. 1) can search the registrations to determine whether the login name main part and the login password correspond to a registered user (209). For example, the server authenticates the current user associated with the login request. In some embodiments, the server searches the account table to determine whether an account record that matches the combination of the login name main part and the login password exists. If the server determines that an account record that matches the combination of the login name main part and the login password exists, then the server permits the user to log in. In contrast, if the server determines that matches of the combination of the login name main part and the login password do not exist, then the server refuses to log in the user.

At 210, access is denied. In some embodiments, the server denies access (e.g., to an application system) in the event that the server determines that the login name main part and the login password that are received from the user are not valid (e.g., if the combination of the login name main part and the login password does not exist in the database of registered users or registered user identifiers).

In contrast, at 211, access is provided. In some embodiments, the server permits the user access in the event that the server determines that the login name main part and the login password that are received from the user are valid.

In some embodiments, different users are permitted to use the same login name main part to register, and thus obviates the problem of registration and login inconvenience that results from a twice-issued user identifier (e.g., a twice issued mobile phone number). In the registration process, if the login name main part that is used by the user is unique in the account table (e.g., the login name main part does not conflict with a record for another user such as an old user), then the user that sent the registration request is not a conflicting new user. Accordingly, the registration request of the user will be handled according to a conventional registration process such as the registration process at 204. The conventional registration process can require the issuance of verification and other processing procedures.

Referring back to Table 1, the records for which the sequential numbers are respectively indicated to be 2 and 3 are the account records (also called "user records") of a first user (e.g., Kevin) and a second user (e.g., Tony), respectively. Assume that the login name main part is a mobile phone number. The first user (Kevin) first uses the mobile phone number 18611180751 to register an account. Sometime thereafter, the first user (Kevin) no longer uses this mobile phone number. For example, the first user can abandon, or otherwise disclaim use of the mobile phone number. Thereafter, the operator recovers the number and allocates the mobile phone number to the second user (Tony). The second user (Tony) can use this mobile phone number and register an account. As a result of undergoing the login password differentiation process from an existing registration processing of 205 of FIG. 2, the second user's (Tony's) login name includes the mobile phone number and a conflict identification parameter added thereto. The conflict identification parameter can be added to the mobile phone number to differentiate the second user's registration with the mobile phone number from the first user's registration with the mobile phone number. Accordingly, the records of the first user and the second user are no longer the same in the account table. For example, the first user's (Kevin's) and the second user's (Tony's) login names stored in the account table are no longer the same. In some embodiments, the uniqueness of the login names in the same field is guaranteed. At this point, the second user (Tony) is permitted to register the second user's account and to login without affecting the first user (Kevin).

In a traditional processing approach, the application system does not need to consider the issue of whether different users have the same password because the user identifiers of the users are unique. Theoretically, according to an application system using the traditional processing approach, all users in the application system are permitted to use the same login password. However, in relation to 205 and 206 of the method 200 illustrated in FIG. 2, successful user registration requires that at least each account associated with a particular login name main part have a different corresponding login password. For example, if the second user (Tony) wishes to successfully register with the application system, the second user must use a login password that is different from the login password associated with the first user (Kevin). In some embodiments, the login process, such as the process of 208-211, is based on matching combinations of login names and passwords. If multiple account records corresponding to 18611180751 exist, comparing login passwords one by one can be necessary. In a traditional scheme, the login name main part (e.g., 18611180751) cannot exist in two account records. Therefore, if the search process of the traditional scheme uses 18611180751 to conduct a search and finds one account record, but the login password associated with the found account record does not match the login password received by a user in connection with a login request, the search process will immediately exit the search and indicate login failure. However, the search process according to various embodiments of the present application requires that the process be continued to find all records that have a matching login name main part. In some embodiments, only when the search process finds that there is no matching login password in any account record corresponding to the login name main part (e.g., 18611180751) does the search process determine that the user login has failed. For example, the search process compares the login password received in connection with a login request to all account records having the login name main part associated therewith.

In some embodiments, in the event that the current user who is requesting registration corresponds to a conflicting new user (e.g., Tony) corresponding to a conflicting old user (e.g., Kevin), a guided process flow can be used for the login password differentiation process in the registration process to guide the conflicting new user (Tony) in using a login password that is different from the login password used by the conflicting old user (Kevin). There are multiple implementations of the guided process flow for the login password differentiation process. The following examples are now provided as references for implementing the guided process flow for the login password differentiation process. In some embodiments, two major categories of guided process flow for the login password differentiation process exist. One category of guided process flow for the login password differentiation process is the refuse registration guidance mode and the other category of guided process flow for the login password differentiation process is the password rule guidance mode.

a. Refuse Registration Guidance Mode of Login Password Differentiation

In some embodiments, a server determines user registration to be successful if the login password received in relation to the registration request does not match a login password associated with an existing registration having the same login name main part; and the server determines user registration is unsuccessful if the login password received in relation to the registration request does match the login password associated with an existing registration having the same login name main part. In some embodiments, the special registering module 125 is further configured to acquire the login password in the new user's (Tony) registration request. The special registering module 125 can check whether the login password is the same as the login password of the conflicting old user (Kevin). If the special registering module 125 determines that the login password of the current user is not the same as the login password of the conflicting old user, the special registering module 125 determines that the current user registration is successful. If the special registering module 125 determines that the login password of the current user is the same, the special registering module 125 refuses the registration request. The special registering module 125 can operatively output an alert indicating that the login password does not comply with the security rule (e.g., that the login password of the current user is the same as the login password of a conflicting old user) so as to require the user to re-input a different login password. Generally, the probability that two users will set the same login password is very low. The likelihood that the new and old users in a case of a twice-issued user identifier (e.g., mobile phone number) will set the same login password is even lower (e.g., the probability that two users with the same user identifier select the same login password approaches zero). However, various embodiments take into consideration some application scenarios that involve extremely strict security requirements. For example, in an Internet financial application, the login password that the second user (Tony) is setting up would undergo checking and guidance. Upon discovering that a password conflict exists between the proposed login password and the login password of an existing user (e.g., a user associated with a conflicting user identifier), an alert indicating that the login password does not conform to the security rule would be output in order to guide the new user towards using (e.g., selecting) a different login password.

Figure 3A:
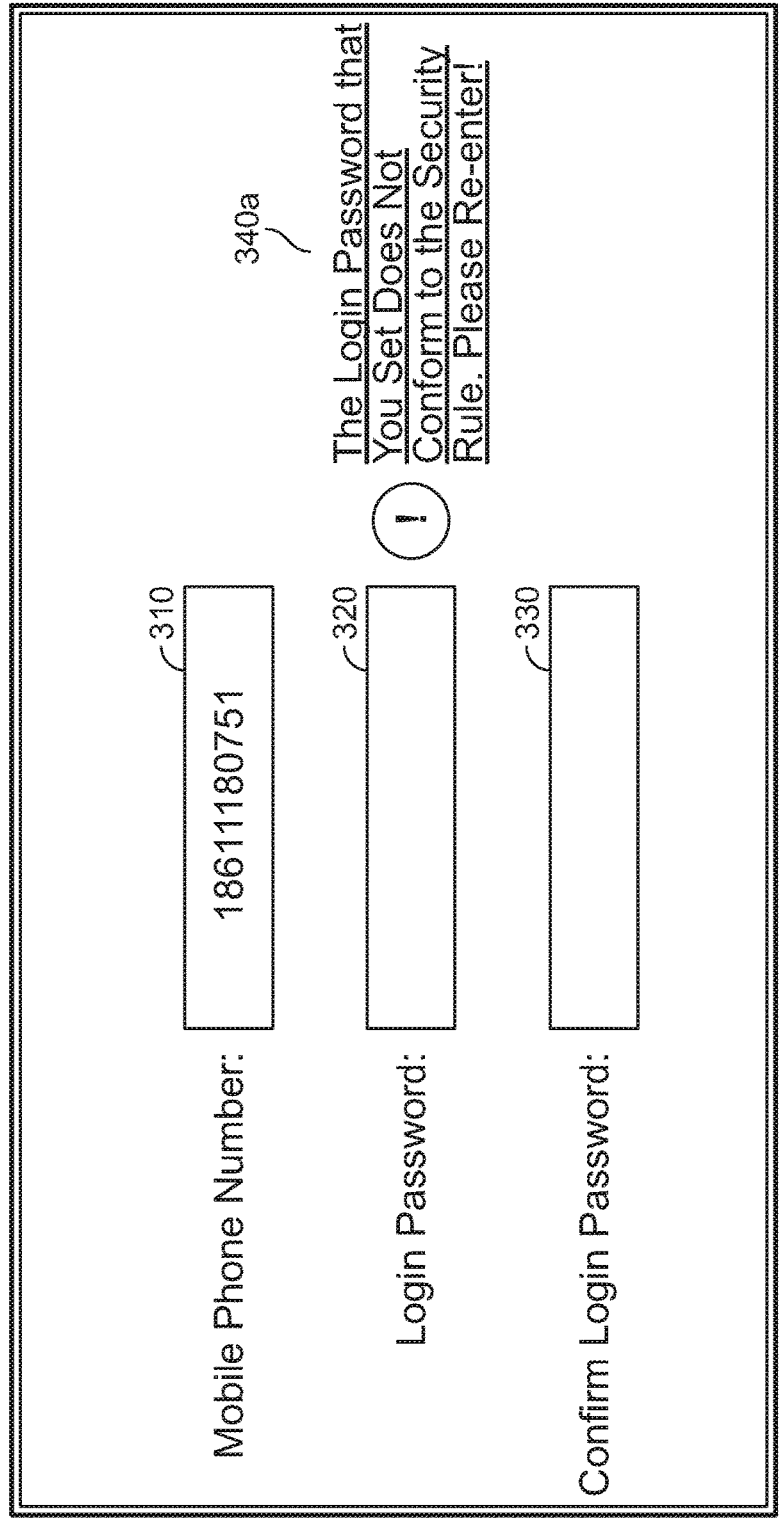
FIG. 3A is a diagram of an interface related to a guided process flow for a login password differentiation process according to various embodiments of the present application.

FIG. 3A is a diagram of an interface related to a guided process flow for a login password differentiation process according to various embodiments of the present application.

Referring to FIG. 3A, an interface 300 displayed in connection with a login password differentiation process is displayed. In some embodiments, the interface 300 is implemented by the user account management device 100 of FIG. 1. In some embodiments, the interface 300 is implemented in connection with method 200 of FIG. 2. In some embodiments, the interface 300 is displayed in connection with method 400 of FIG. 4. In some embodiments, the interface 300 is implemented in system 600 of FIG. 6. For example, the interface 300 can be displayed by the terminal 610.

The interface 300 includes a user identifier field 310 (e.g., a mobile phone number field), a login password field 320, a confirm login password field 330, and a login password alert 340a.

The user identifier field 310 is a field in which the user identifier associated with the registration request is set. The user identifier set in the user identifier field 310 can be populated by a user, or automatically by a server based on information communicated in connection with the registration request.

The login password field 320 is a field in which a login password is entered. The login password entered in the login password field 320 can correspond to a login password that is desired by the user associated with the registration request. The application system (e.g., the server) can determine whether the login password entered in the login password field 320 satisfies login password criteria. In the event that the login password entered in the login password field 320 satisfies all of the login password criteria, the login password can be deemed acceptable. In contrast, in the event that the login password entered in the login password field 320 does not satisfy all of the login password criteria, the login password can be deemed to be unacceptable.

In the event that the login password entered in the login password field 320 does not satisfy all of the login password criteria, an alert can be provided in the login password alert field 340a. The login password alert field 340a can provide an indication that the login password entered in the login password field 320 is not acceptable. The login password alert field 340a can provide an indication of the specific login password criteria that the login password field 320 does not satisfy. The alert provided in the login password alert field 340a can request that the user re-enter a password that satisfies the login password criteria. The alert can provide guidelines of the various login password criteria. The login password criteria can include a maximum number of alphanumeric characters, a minimum number of alphanumeric characters, a requirement of a special character, a minimum number of capital letters, a difference between the login password and a word in a word table such as a dictionary, a matching between the login password entered in the login password field 320 and the password entered in the confirm login password field 330, or the like.

The confirm login password field 330 is a field in which a login password is entered. The login password entered in the login password field 320 can correspond to a login password that is desired by the user associated with the registration request.

Returning to the example above, in the event that that the login password does not conform to the security rule, an alert (e.g., provided in the login password alert field 340a) indicating is output in order to guide the new user towards using (e.g., selecting) a different login password is provided to the second user (Tony) entered (e.g., in the login password field 320). Upon receiving such an alert, the current user (Tony) would generally try a login password with a higher password strength. The login password that the second user inputs thus will inevitably differ from the login password that the second user previously input (which was also the login password of the first user (Kevin)). In this way, the second user is guided to a different password. Such a guidance mode is extremely simple and can satisfy the needs of most situations.

In some embodiments, the guidance mode is further enhanced to raise the security thereof. For example, assuming that the login password input by the second user (Tony) in the registration request is exactly the same as the login password of the first user (Kevin). In this case, the method or system will provide an alert that indicates: "Login password does not conform to security rule." Thus, the second user (Tony) can infer that the login password input by the second user (Tony) is possibly the same as the login password used by the first user (Kevin), which could make the first user's (Kevin')s account vulnerable to theft. To avoid an extremely unlikely security hole of this sort, the server (e.g., the special registration module 125 of the user management device 100) is further configured to select a random positive integer N (e.g., a positive integer smaller than 8) and to refuse the first N registration requests submitted by the current user (e.g., the second user (Tony)). Moreover, with each refusal of a registration request, an alert indicating that the login name does not comply with the security rule can be output (e.g., by the server or the special registration module 125). After completing the Nth refusal corresponding to the refusal of the Nth registration request, in the event that an (N+1)th registration request is submitted by the current user (e.g., the second user (Tony)), a login password in the (N+1)th registration request is acquired and the login password associated with the (N+1)th registration request is checked as to whether the login password is the same as the login password of the conflicting old user (e.g., the first user (Kevin)). In some embodiments, the server (e.g., the special registration module 125) receives the login password associated with the (N+1)th registration request and determines whether such a password is the same as a login password of the conflicting old user. In the event that the login password associated with the (N+1)th registration request and the login password of the conflicting old user are the same, then the (N+1)th registration request can be refused and an alert indicating that the login password does not comply with the security rule can be output (e.g., on an interface such as interface 300). In the event that the login password associated with the (N+1)th registration request and the login password of the conflicting old user are not the same, then the current user registration can be determined to be successful. Because of the random number of refusals mechanism, the current user (e.g., the second user (Tony)) is unable to learn the reason why the system rejected the password that the current user input. Accordingly, the login password of the first user (Kevin) can thus be effectively protected. A situation, which though unlikely, would allow the current user (Tony) to easily guess the password of the first user (Kevin) is avoided. Of course, for the sake of user experience for the current user, the system could output in advance an appropriate indication providing an explanation (e.g., on a page, in a dialog box, or the like). For example, an indication could state: "The current process is a special process for conflicting registrations which requires patient cooperation on the part of users. In order to ensure the security of users with conflicting login passwords, users will be required to attempt several different login passwords. The system will randomly select a reasonable login password."

b. Password Rule Guidance Mode of Login Password Differentiation

The password rule guidance mode of the login password differentiation process can include many implementations. Typical implementations can include a length rule guidance mode, a specified character guidance mode, and a class quantity guidance mode.

I. Length Rule Guidance Mode

In some embodiments, the login password of the current user is checked to determine whether the login password satisfies a predetermined length criteria (or rule). For example, the special registration module 125 of the user management device 100 can be further configured to determine whether the login password associated with the registration request of the current user (e.g., the second user (Tony)) matches a predetermined length rule. In the event that the login password associated with the registration request of the current user does match the predetermined length rule, then the user registration can be deemed successful (e.g., assuming other registration criteria is satisfied). In the event that the login password associated with the registration request of the current user does not match the predetermined length rule, then, on the current page, in a dialog box, or the like, the current user (Tony) can be prompted to re-input a login password that complies with the predetermined length rule, wherein the length of the conflicting old user login password does not comply with the predetermined length rule.

Figure 3B:
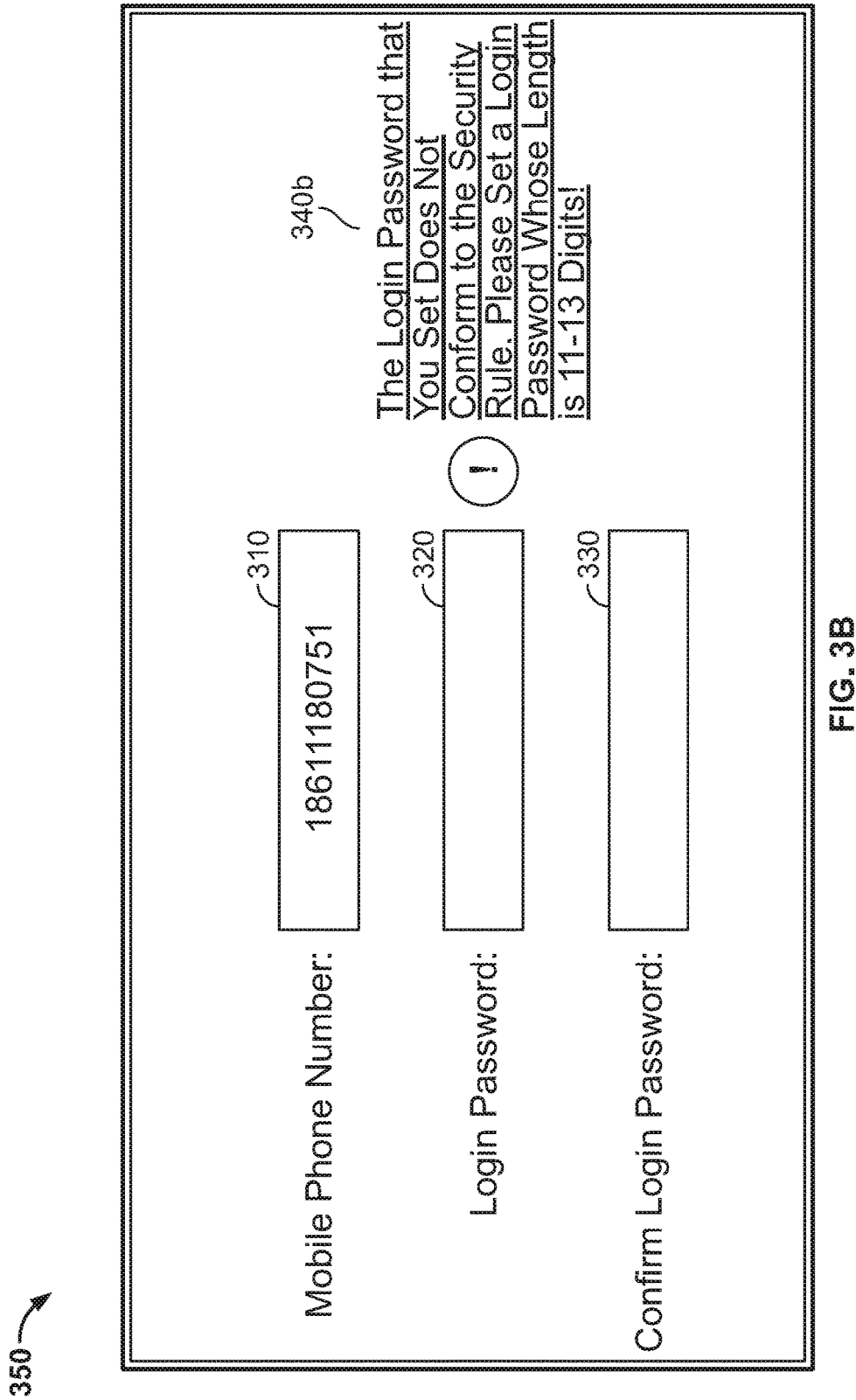
FIG. 3B is a diagram of an interface related to a guided process flow for a login password differentiation process according to various embodiments of the present application.

FIG. 3B is a diagram of an interface related to a guided process flow for a login password differentiation process according to various embodiments of the present application.

Referring to FIG. 3B, an interface 350 displayed in connection with a login password differentiation process is displayed. In some embodiments, the interface 350 is implemented by the user account management device 100 of FIG. 1. In some embodiments, the interface 350 is implemented in connection with method 200 of FIG. 2. In some embodiments, the interface 350 is displayed in connection with method 400 of FIG. 4. In some embodiments, the interface 350 is implemented in system 600 of FIG. 6. For example, the interface 350 can be displayed by the terminal 610.

The interface 350 includes a user identifier field 310 (e.g., a mobile phone number field), a login password field 320, a confirm login password field 330, and a login password alert 340b.

The user identifier field 310 is a field in which the user identifier associated with the registration request is set. The user identifier set in the user identifier field 310 can be populated by a user, or automatically by a server based on information communicated in connection with the registration request.

The login password field 320 is a field in which a login password is entered. The login password entered in the login password field 320 can correspond to a login password that is desired by the user associated with the registration request. The application system (e.g., the server) can determine whether the login password entered in the login password field 320 satisfies login password criteria such as the predetermined length rule. In the event that the login password entered in the login password field 320 satisfies all of the login password criteria, the login password can be deemed acceptable. In contrast, in the event that the login password entered in the login password field 320 does not satisfy all of the login password criteria, the login password can be deemed to be unacceptable.

In the event that the login password entered in the login password field 320 does not satisfy all of the login password criteria, an alert can be provided in the login password alert field 340b. The login password alert field 340b can provide an indication that the login password entered in the login password field 320 is not acceptable. For example, in the event that the login password entered in the login password field 320 does not satisfy the predetermined length rule, the login password field 340b can provide an indication that the login password entered in the login password field 320 does not satisfy the security rule(s) and the user can be prompted to enter a login password in the login password field 320 that has a predetermined length (e.g., a predetermined minimum number of digits).

The confirm login password field 330 is a field in which a login password is entered. The login password entered in the login password field 320 can correspond to a login password that is desired by the user associated with the registration request.

Returning to the example above, assume that the login password used by the conflicting old user (e.g., the first user (Kevin)) is 10 digits. The password length rule applied to new users attempting to register the user identifier associated with the conflicting old user can require that the login password associated with the new users has a length that is not the same as the length of the login password used by the conflicting old user. For example, the server (e.g., a special processing module) can select any password length interval which does not have a length of 10 digits. For example, a length interval from 11 digits to 13 digits can serve as the length rule for a user attempting to register a user identifier that is the same as the user identifier of the conflicting old user (e.g., the first user (Kevin)). If the current user (e.g., the second user (Tony)) submits a password having a length that does not conform to this length rule (e.g., the length interval from 11 digits to 13 digits), the registration request associated with the current user can be rejected until the length of a password input by the current user conforms to the predetermined length rule. As a result of the length rule, the login password of the current user (e.g., the second user (Tony)) has to differ in length from the login password of the conflicting old user (e.g., the first user (Kevin)). The predetermined length rule causes two passwords associated with the same user identifier (e.g., the mobile phone number) to be different. In this case, theoretically, the current user (e.g., the second user (Tony)) only infers that the login password of the conflicting old user (e.g., the first user (Kevin)) does not have a length in the 11 to 13 interval. The likelihood that the current user (e.g., the second user (Tony)) can guess the login password of the conflicting old user (e.g., the first user (Kevin)) is small. Giving consideration now to an extreme situation, assume that more than one conflicting old user exists in relation to a user identifier (e.g., a mobile phone number) (e.g., a twice-issued mobile phone number has occurred twice such that a mobile phone number has been issued three times). In such a case, another conflicting old user (e.g., a second conflicting old user (Mike)) can exist. The password length of the login password associated with the other conflicting old user (Mike) can be, for example, 13 digits. Thus, the password length of the respective login passwords associated with the conflicting old user (e.g., the first user (Kevin)) and the other conflicting old user (e.g., the second conflicting user (Mike)) cannot comply with the predetermined length rule (as the predetermined length rule is applied to the current user (Tony)). Consequently, the predetermined length rule can be adjusted to more than 13 digits or to from 11 to 12 digits. In some embodiments, the predetermined length rule causes the current user attempting to register a user identifier for which one or more conflicting users exist to select a login password that has a password length that is different than the password length for any of the respective login passwords associated with the one or more conflicting users.

II. Specified Character Guidance Mode

In some embodiments, the login password of the current user is checked to determine whether the login password satisfies a specified character criteria (or rule). The specified character criteria can require that a corresponding login password includes a specific character. For example, the special registering module 125 of the user management device 100 can be further configured to determine whether the login password associated with the registration request of the current user comprises a specific character. In the event that the login password associated with the registration request of the current user does include the specific character, then the user registration can be deemed successful (e.g., assuming other registration criteria is satisfied). In the event that the login password associated with the registration request of the current user does not include the specific character, then on the current page, in a dialog box, or the like, the current user (e.g., the second user (Tony) using the example above) can be prompted to re-input a login password comprising the specified character. In some embodiments, the specific character can be selected according to the respective login passwords of any conflicting old users associated with the same user identifier. For example, the specific character can be selected such that the specific character is not included in the login password used by the conflicting old user. In some embodiments, the specified character guidance mode requires that the current user (e.g., the second user (Tony)) uses a character in the user's login password that is not included in the login password of the conflicting user (e.g., the first user (Kevin)). Thus, when the current user (e.g., the second user (Tony)) registers the user identifier, the login password will necessarily be different from the login password of the conflicting old user (Kevin). In this case, theoretically, the current user (e.g., Tony) can only infer that the login password of the conflicting old user does not include a specified character (e.g., "A"). The likelihood that the current user (e.g., the second user (Tony)) can guess (using this inference) the login password of the conflicting old user (e.g., the first user (Kevin)) is small. In the case of any other (e.g., subsequent) registrations associated with the user identifier, none of the passwords of any of the conflicting old users (or new users) will include the specified character used in the registration of the current user (Tony).

Figure 3C:
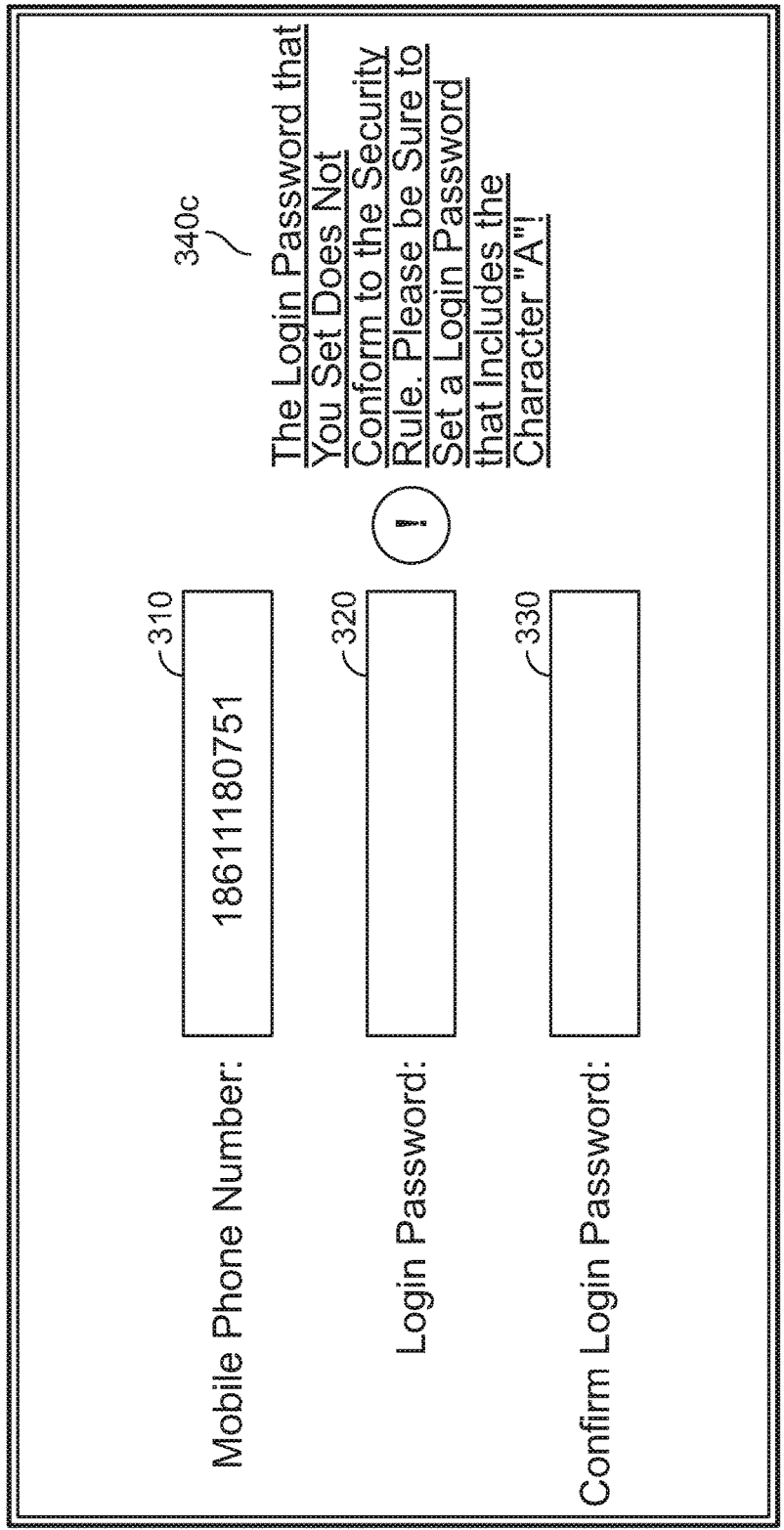
FIG. 3C is a diagram of an interface related to a guided process flow for a login password differentiation process according to various embodiments of the present application.

FIG. 3C is a diagram of an interface related to a guided process flow for a login password differentiation process according to various embodiments of the present application.

Referring to FIG. 3C, an interface 360 displayed in connection with a login password differentiation process is displayed. In some embodiments, the interface 360 is implemented by the user account management device 100 of FIG. 1. In some embodiments, the interface 360 is implemented in connection with method 200 of FIG. 2. In some embodiments, the interface 360 is displayed in connection with method 400 of FIG. 4. In some embodiments, the interface 360 is implemented in system 600 of FIG. 6. For example, the interface 360 can be displayed by the terminal 610.

The interface 360 includes a user identifier field 310 (e.g., a mobile phone number field), a login password field 320, a confirm login password field 330, and a login password alert 340c.

The user identifier field 310 is a field in which the user identifier associated with the registration request is set. The user identifier set in the user identifier field 310 can be populated by a user, or automatically by a server based on information communicated in connection with the registration request.

The login password field 320 is a field in which a login password is entered. The login password entered in the login password field 320 can correspond to a login password that is desired by the user associated with the registration request. The application system (e.g., the server) can determine whether the login password entered in the login password field 320 satisfies login password criteria such as the specified character rule. In the event that the login password entered in the login password field 320 satisfies all of the login password criteria, the login password can be deemed acceptable. In contrast, in the event that the login password entered in the login password field 320 does not satisfy all of the login password criteria, the login password can be deemed to be unacceptable.

In the event that the login password entered in the login password field 320 does not satisfy all of the login password criteria, an alert can be provided in the login password alert field 340c. The login password alert field 340c can provide an indication that the login password entered in the login password field 320 is not acceptable. For example, in the event that the login password entered in the login password field 320 does not satisfy the specified character rule, the login password field 340c can provide an indication that the login password entered in the login password field 320 does not satisfy the security rule(s) and the user can be prompted to enter a login password in the login password field 320 that has a predetermined character (e.g., a specific character that the login password is required to include).

The confirm login password field 330 is a field in which a login password is entered. The login password entered in the login password field 320 can correspond to a login password that is desired by the user associated with the registration request.

III. Class Quantity Guidance Mode:

In some embodiments, the login password of the current user is checked to determine whether the login password satisfies a predetermined character class criteria (or rule). The predetermined character class criteria can require that a corresponding login password includes a predetermined character class. For example, the special registering module 125 of the user management device 100 can be further configured to determine whether the login password associated with the registration request of the current user (e.g., the second user (Tony)) matches a predetermined character class rule. In the event that the login password associated with the registration request of the current user matches the predetermined character class rule, then the user registration can be deemed successful. In the event that the login password associated with the registration request of the current user does not match the predetermined character class rule, then on the current page, in a dialog box, or the like, the current user (e.g., the second user (Tony)) can be prompted to re-input a login name matching the character class rule. In some embodiments, the predetermined character class can be selected according to the respective login passwords of any conflicting old users associated with the same user identifier. For example, the specific character can be selected such that the predetermined character class is not included in the login password used by the conflicting old user. In some embodiments, the class quantity guidance mode can require that a login password include a particular type of characters (e.g., both letters and numbers) The predetermined character class rule can require that a login password includes a minimum number of letters or a minimum number of numbers. As an example, the special registration module can output on the current page, in a dialog box, or the like, a prompt indicating that the password input by the current user (Tony) must only include three classes of characters: letters, numbers, and symbols. In some embodiments, the login passwords of different users (Kevin and Tony) associated with an identical user identifier have to differ at least in respect to one character class. For example, either the login password of the first user (Kevin) must have at least one more character class than the login password of the second user (Tony), or the login password of the second user (Tony) must have at least one more character class than the login password of the first user (Kevin). Accordingly, the login passwords must differ and the likelihood that the second user (Tony) is able to guess the login password of the first user (Kevin) is extremely small.

Persons with ordinary skill in the art could develop more implementations of guided process flows for password differentiation in accordance with the comprehensive needs of security and user experience in light of the above embodiments.

The technical advantages of various embodiments will be expounded in the form of preferred embodiments that are based on the embodiments described above and that are associated with more application realities. In the following description, mobile phone numbers will serve as examples of login names (e.g., user identifiers). In a scheme that approximates an actual layout, various embodiments implement optimizing measures to further increase the effectiveness of the present application in actual use. Of course, these measures are not necessary. Moreover, combinations of the various optimizing measures may be flexibly selected according to need.

Various embodiments can include a conflict eliminating method or mechanism. For example, various embodiments can build on the foundation of the embodiments described above, and may further introduce a conflict eliminating mechanism. In some embodiments, a conflict resolving mechanism that rests on the foundation described in relation to steps 201 through 204 is provided. Various embodiments described above can solve the problems of conflicting registrations and conflicting logins (e.g., conflicting user identifiers). For example, various embodiments described above can resolve, or otherwise eliminate, the problems associated with two users using the same mobile phone number (e.g., as a user identifier) to log in. From the viewpoint of application service used by users, however, mobile phone numbers are undoubtedly quite important to users, as for example when the users receive verification messages. If an application requires that a verification message be received and then entered, or otherwise submitted to an application (e.g., on a page, or the like), one user (e.g., the first user (Kevin)) will in this case be unable to receive a corresponding verification message. The verification message can be sent via a Short Message Service (SMS) message, a Multimedia Message Service (MMS) message, a phone call, email, an Application (App), the like, or any combination thereof. The verification message can be pushed within an App installed on the device. The verification message can be a message comprising an alphanumeric string. The verification message can be randomly generated. In some embodiments, the verification message is unique (e.g., at least in relation to a verification message sent to other users associated with the same user identifier). The first user will be unable to receive the verification message corresponding thereto because the mobile phone number can be owned by only one user (e.g., the second user (Tony)) at a time. In such a situation, various embodiments can perform special processing in relation to a conflict identification parameter. For example, in the event that a user successfully logs in (e.g., to an application, an application service, or the like), the user login name can be checked to determine whether the user login name includes a conflict identification parameter. The server (e.g., the server hosting, or otherwise associated with, the application or application service) can check the user login name to determine whether the user login name includes the conflict identification parameter. In the event that the user login name includes a conflict identification parameter, then a mobile phone number revising interface to guide the conflicting old user to revise the conflicting old user's associated mobile phone number can be pushed. For example, the login management module 127 of the user management device 100 can push a notification including a link and/or a user identifier revising interface (e.g., the mobile phone number revising interface) to any of the conflicting old users associated with the same user identifier (e.g., the mobile phone number). As another example, any of the conflicting old users associated with the same user identifier can be prompted to edit their corresponding application settings, including the communication information such as the user's mobile phone number. After a new mobile phone number is received from the corresponding conflicting old user, the corresponding account record is updated to include the new mobile phone number. For example, the server updates the corresponding account record to change the mobile phone number associated with the account record to correspond to the new mobile phone number that the server received from the corresponding conflicting old user. The updating of the mobile phone number associated with the account record (e.g., associated with a conflicting old user) can include updating, or otherwise changing, the login name or user identifier associated with the account record. In some embodiments, the conflicting old user associated with the updated account record uses the new mobile phone number as the login name main part for logging in to the application or application service in a subsequent login process. In some embodiments, after the user inputs a new mobile phone number, the server (e.g., the login management module 127 of the user management device 100) sends a verification issued for the new mobile phone number. The verification issued for the new mobile phone number can be a verification message that verifies the new mobile phone number (e.g., the verification message can be used as a second factor authentication of the conflicting old user and the new mobile phone number). For example, the server can send a verification message including a verification code to the new mobile phone number, and in response to submission of a verification code by the conflicting old user, the server will determine whether the verification code submitted by the conflicting old user (e.g., to the interface provided to the conflicting old user) is correct so as to confirm whether the user is a rightful user of the new mobile phone number. The process of sending a verification to the new phone number or the conflicting old user is similar to the registration process described above and will not be discussed in further detail here.

In some embodiments, a conflicting old user who modifies the user identifier (e.g., the mobile phone number) associated therewith can encounter a situation in which the new user identifier corresponds to a twice-issued user identifier. For example, the new user identifier selected by the conflicting old user can correspond to a user identifier that has been registered in association with registration of a different user. Assuming that the mobile phone number input by the first user (e.g., Kevin) is, as before, 18611180751. Such a mobile phone number is the same as the original mobile phone number and is not a new mobile phone number. In this case, the system cannot determine whether the first user (Kevin) or the second user (Tony) is the rightful user of this mobile phone number. A simple way of resolving such a problem is to require the first user (Kevin) to change the mobile phone number associated therewith and not permit the first user to continue with the login until the first user changes the mobile phone number associated therewith. However, in fact, the second user (Tony) may only be using the mobile phone number (e.g., that is associated with the first user) temporarily, and the first user (Kevin) can be the rightful user (e.g., true owner) of the mobile phone number. In some embodiments, the user is guided in modifying the mobile phone number associated therewith to resolve such a conflict.

Figure 4:
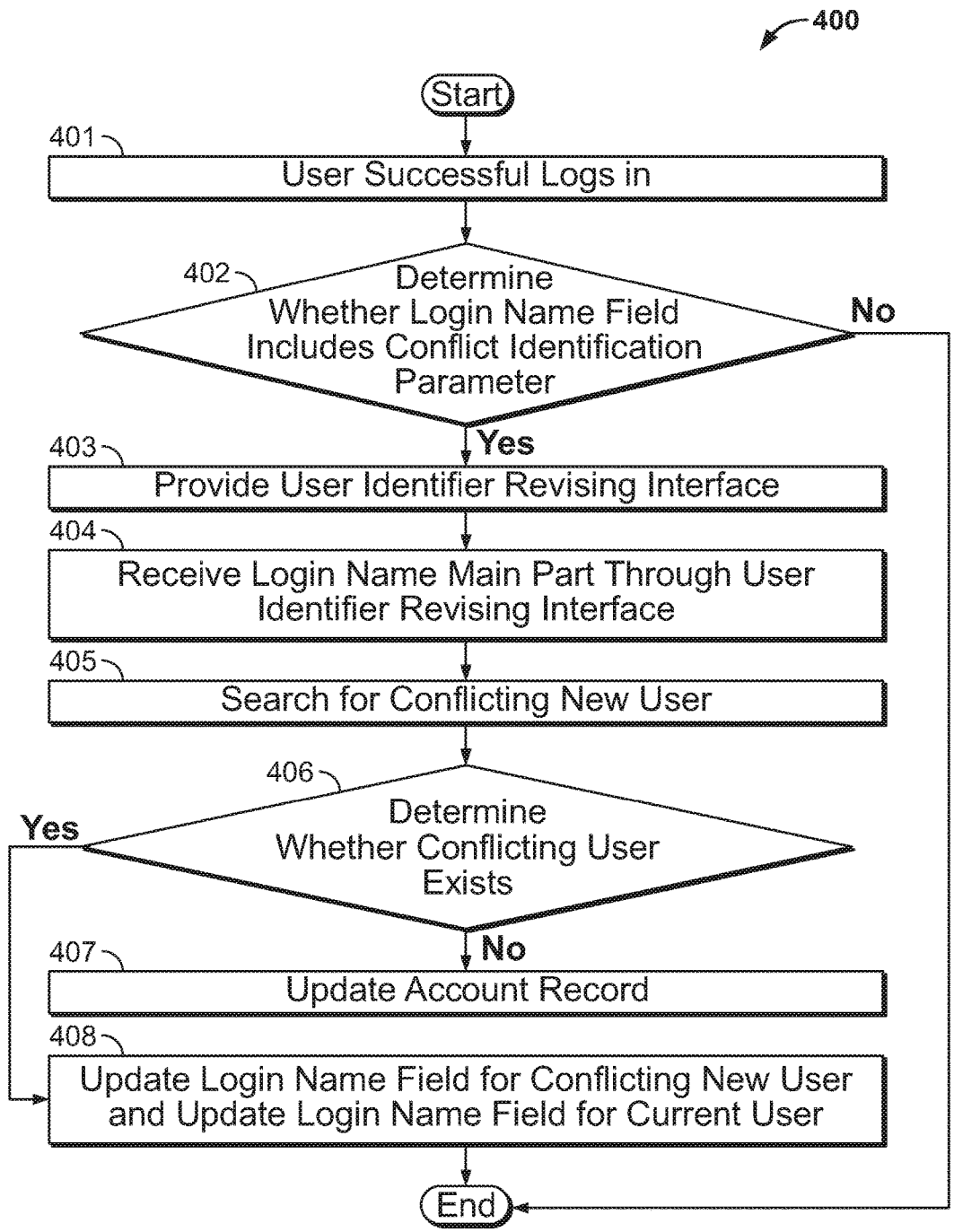
FIG. 4 is a flowchart of a method for guiding a user to modify the user's mobile phone number according to various embodiments of the present application.

FIG. 4 is a flowchart of a method for guiding a user to modify the user's mobile phone number according to various embodiments of the present application.

Referring to FIG. 4, a method 400 for user account management is provided. In some embodiments, the method 400 can be implemented by device 100 of FIG. 1. In some embodiments, the method 400 is implemented by system 600 of FIG. 6. In some embodiments, the method 400 can implement the interface 500 of FIG. 5.

At 401, a user is successfully logged in. The user can successfully log in by providing a user identifier and login password. In the event that the user provides a server with a user identifier and login password, the server can authenticate the user with a user identifier and associated password stored in a database (e.g., an account table). If the user identifier and the login password received by the user match the user identifier and associated login password stored in the database, then the server provides successful login of the user (e.g., the server can provide access to the application or application service).

At 402, the login name field can be analyzed to determine whether the login name field includes a conflict identification parameter. In some embodiments, the server checks the login name field to determine whether the login name field includes the conflict identification parameter. For example, in the event that the current user has successfully logged in, the login management module 127 of the user management device 100 of FIG. 1 checks the login name field of the user account record to determine whether the login name field of the user account record includes a conflict identification parameter. For example, assuming there is unique login name-password paring in the account database (e.g., id 1234 and corresponding password abc, and id 1234|5 and corresponding password def) each unique login name-password pairing corresponds to separate entries.

In the event that the login name field of the user account record does not include the conflict identification parameter, then the method 400 can end.

In the event that the login name field of the user account record includes the conflict identification parameter, then, at 403, a user identifier revising interface is provided to the current user. For example, at 403, the server sends to the current user a user identifier revising interface (e.g., a user a login name main part revising interface). The user identifier revising interface can be configured to guide the current user in revising the login name main part associated with the account record of the current user.

At 404, a user identifier can be received through the user identifier revising interface. In some embodiment, a login name main part is received through the user identifier revising interface. The server can receive the user identifier from the current user by the current user submitting the user identifier to the user identifier revising interface. The user identifier revising interface can be a web page (e.g., an HTML page or the like), a page presented in an application to which the user successfully logged in, or the like. In some embodiments, the special registration module 125 of the user management device 100 acquires the login name main part input by the current user through the login name main part revising interface.

At 405, a search for a conflicting new user can be performed. The server can search for a conflicting new user in response to receiving the user identifier through the user identifier revising interface. For example, the server can search the account table to determine whether a conflicting new user that is using (e.g., is associated with) the received login name main part exists. In some embodiments, the special registration module 125 of the user management device 100 searches the database (e.g., the account table) to determine whether a conflicting new user exists.

As a result of the search for a conflicting new user, it is determined at 406 whether a conflicting new user exists. In the event that a conflicting new user does not exist in the database (e.g., the account table), then at 407, the current user account record is updated. For example, the user identifier (e.g., the login name main part) is updated in the corresponding current user account record. In some embodiments, the server updates the account record associated with the current user. For example, the special registration module 125 of the user management device 100 can update the account record associated with the current user.

In the event that a conflicting new user exists, then the login name field for the conflicting new user and the login name field for the conflicting old user can be updated at 408. For example, a conflict identification parameter can be added in the login name field of the conflicting new user. The server (e.g., the special registration module 125 of the user management device 100) can add the conflict identification parameter in the login name field of the conflicting new user. In some embodiments, the addition of the conflict identification parameter causes the user associated with the account record to which the conflict identification parameter is added to become a conflicting old user. In some embodiments, the conflict identification parameter is deleted from the login name field of the current user account record.

Referring to Tables 1 and 2, using the examples of the first user (e.g., Kevin) and the second user (Tony), assume that the first user (Kevin) corresponds to a conflicting old user. The mobile phone number submitted by the first user on the login name revising interface has changed. For example, the mobile phone number submitted by the first user (e.g., the user associated with the sequential number having a number of 2) has become 18611223344. In this case, as a result of processing carried out in accordance with 402, 403, 404, and 405, a conflict between the login name main part of the first user (Kevin) and the login name main part of the second user (Tony) no longer exists. The login name (e.g., the login name main part) of the first user (Kevin) will become a uniquely used mobile phone number. In this case, the account table will be updated from Table 1 to the example of Table 2.

TABLE 2

| Sequential number | Field 1<br>Login name + Separator character +<br>Identification factor | Field 2<br>Login password |
| --- | --- | --- |
| 1 | 13900100110 | aaaaaa |
| 2 | 18611223344 | bbbbbb |
| 3 | 18611180751 | cccccc |
| 4 | 13988888888 | aaaaaa |
| ... | ... | ... |

However, if the mobile phone number input by the first user (Kevin) is assumed to be, as before, 18611180751, then the first user (Kevin) is indicating that he uses (e.g., is the rightful user or owner of) this mobile phone number. For example, the second user indicates to the system that the second user still uses the mobile phone number. In this case, the system cannot determine the true user (e.g., true or rightful owner) of this mobile phone number. Therefore, the server (e.g., the system) can issue a verification to the first user prior to 404 or 405 of method 400. The verification process can include a known text/SMS-based verification scheme and will not be described in further detail. For example, some related art describes verification processes. In the event that the verification succeeds, the first user (Kevin) becomes (e.g., is considered to be) a conflicting new user, and the second user (Tony) becomes (e.g., is considered to be) a conflicting old user from being a conflicting new user. Referring to Tables 1 and 3, in the event that the verification succeeds, Table 1 will be updated to correspond to Table 3. For example, the account record corresponding to the first user can be updated to delete the conflict identification parameter, and the account record corresponding to the second user can be updated to add a conflict identification parameter. Such a design may effectively solve the problem of "counterfeit twice-issued numbers." A true twice-issued user identifier (e.g., mobile phone number) corresponds to a mobile phone number owner experiencing a change. In the case of a "counterfeit twice-issued user identifier," however, the twice-issued user identifier (e.g., mobile phone number) results from cross-use of the user identifier (e.g., mobile phone number). Cross-use of this sort causes the server (e.g., the application system) to view such use of the user identifier as an occurrence of a twice-issued user identifier (e.g., mobile phone number). For example, the first user (Kevin) is considered to be the true owner of 18611180751. The first user (Kevin) uses this mobile phone number to register with a server or application such as the Alipay system. The Alipay system has an account record. Suppose that the second user (Tony) is a younger brother of the first user (Kevin) and that the second user temporarily uses the first user's identifier (e.g., the mobile phone number associated with the account record of the first user). In the case of some special or temporary application need, the second user (Tony) can temporarily use the mobile phone number of the first user (Kevin) to register an Alipay account. In some embodiments, a process will trigger the processing of 201 to 208 of method 200. As a result, the first user (Kevin) becomes a conflicting old user in relation to the Alipay system while the second user (Tony) forcibly seizes the mobile phone number and becomes a conflicting new user. In the event that the first user (Kevin) subsequently logs in to the Alipay system, the Alipay system in 403 of method 400 provides a user identifier revising interface to the first user (Kevin), the conflicting old user, so as to guide the first user (Kevin) in revising the mobile phone number associated with the account record of the first user. At this point, because the first user (Kevin) is the true user (e.g., rightful owner) of the mobile phone number '18611180751,' the first user may still input '18611180751' to the user identifier revising interface. In the event that the first user inputs the same mobile phone number, the Alipay system at this point may consider the first user (Kevin) to be executing a "counter-seizure" of the mobile phone number. In the event that the Alipay system determines that the first user is executing a "counter-seizure" of the mobile phone number, the Alipay system seeks to verify the "counter-seizure" of the mobile phone number by the first user through a verification message. For example, the system can send a verification to the first user by sending a text or SMS message to the mobile phone number. The first user can use information included in the verification message to verify rightful use or ownership of the mobile phone number. In the event that the first user passes the verification, then the first user (Kevin) will become (e.g., be considered to be) the conflicting new user, and the second user (Tony) will become (e.g., be considered to be) the conflicting old user. In the event that the second user (Tony) subsequently logs in to the Alipay system. The Alipay system will provide the second user (Tony) with the user identifier revising interface and guide the second user through a process to revise his mobile phone number. For example, the user identifier revising interface can prompt the second user to update the mobile phone number of the second user. In the event that the second user (Tony) revises the mobile phone number associated with the account record of the second user (e.g., if the mobile phone number associated with the account record is revised to '18622223333'), then the conflict (e.g., the conflict between the mobile phone number associated with the account record of the first user and the mobile phone number associated with the account record of the second user) will disappear (e.g., cease to exist).

TABLE 3

| Sequential number | Field 1<br>Login name + Separator character + Identification factor | Field 2<br>Login password |
|---|---|---|
| 1 | 13900100110 | aaaaaa |
| 2 | 18611180751 | bbbbbb |
| 3 | 18611180751\|R | cccccc |
| 4 | 13988888888 | aaaaaa |
| ... | ... | ... |

Some embodiments provide a mechanism (e.g., a method or system) for creating an independent sub-account related to the main account. For example, some embodiments enable creation of sub-accounts to the main account, which is associated with a particular user identifier. As an example, assume that a user (e.g., Jack) has a phone number corresponding to 13988888888. The user (Jack) can use this phone number to register the Alipay account associated with the first sub-user (e.g., Jack1). For example, the user may use the account associated with the first sub-user to purchase office supplies for the user's own company. However, the user (Jack) may also wish to use the mobile phone number to register another Alipay account. As an example, the user can use the phone number to register the Alipay account associated with the second sub-user (Jack2). For example, the user can use the account associated with the second sub-user (Jack2) to purchase personal supplies for the user. Accordingly, corporate use can be differentiated from personal use (e.g., company purchases can be clearly differentiated from personal spending). Traditional technology does not allow for accounts associated with sub-users to be related to a main account. In some embodiments, the server (e.g., the special registration module 125 of user management device 100), upon receiving a sub-account creation request sent by the current user following successful user login by this user through the current account (set up as the main account), pushes a sub-account creation interface to the user and checks whether the login password input by the user on the interface is the same as the login password of the account to which the user is currently logged in (e.g., the main account or another sub-account). In the event that the login password input by the user in connection with creation of the sub-account is the same as the login password associated with the account to which the user is currently logged in (or another account associated with the user identifier associated with the main account), then the user is prompted (e.g., by the server) to re-input the login password. For example, the user is prompted to select another login password. Otherwise, in the event that the login password input by the user in connection with creation of the sub-account is not the same as the login password associated with the account to which the user is currently logged in (or another account associated with the user identifier associated with the main account), a sub-account is created (e.g., by the server) based on the login name main part (e.g., the user identifier) of the currently logged in account and the login password input by the user, and a relational identification parameter is added to the sub-account login name field. Referring to Table 4, the character "T" can be used as a relational identification parameter. After the sub-account is successfully created, the user (Jack) can use "13988888888" for separate logging in to the two accounts. As an example, by inputting the password "aaaaaa," the user can log into the main account (Jack), and by inputting the password "dddddd," the user can log in to the sub-account (Jack1).

TABLE 4

| Sequential number | Field 1<br>Login name + Separator character + Identification factor | Field 2<br>Login password |
|---|---|---|
| 1 | 13900100110 | aaaaaa |
| 2 | 18611180751\|R | bbbbbb |
| 3 | 18611180751 | cccccc |
| 4 | 13988888888 | aaaaaa |
| 5 | 13988888888\|T | dddddd |
| ... | ... | ... |

Figure 5:
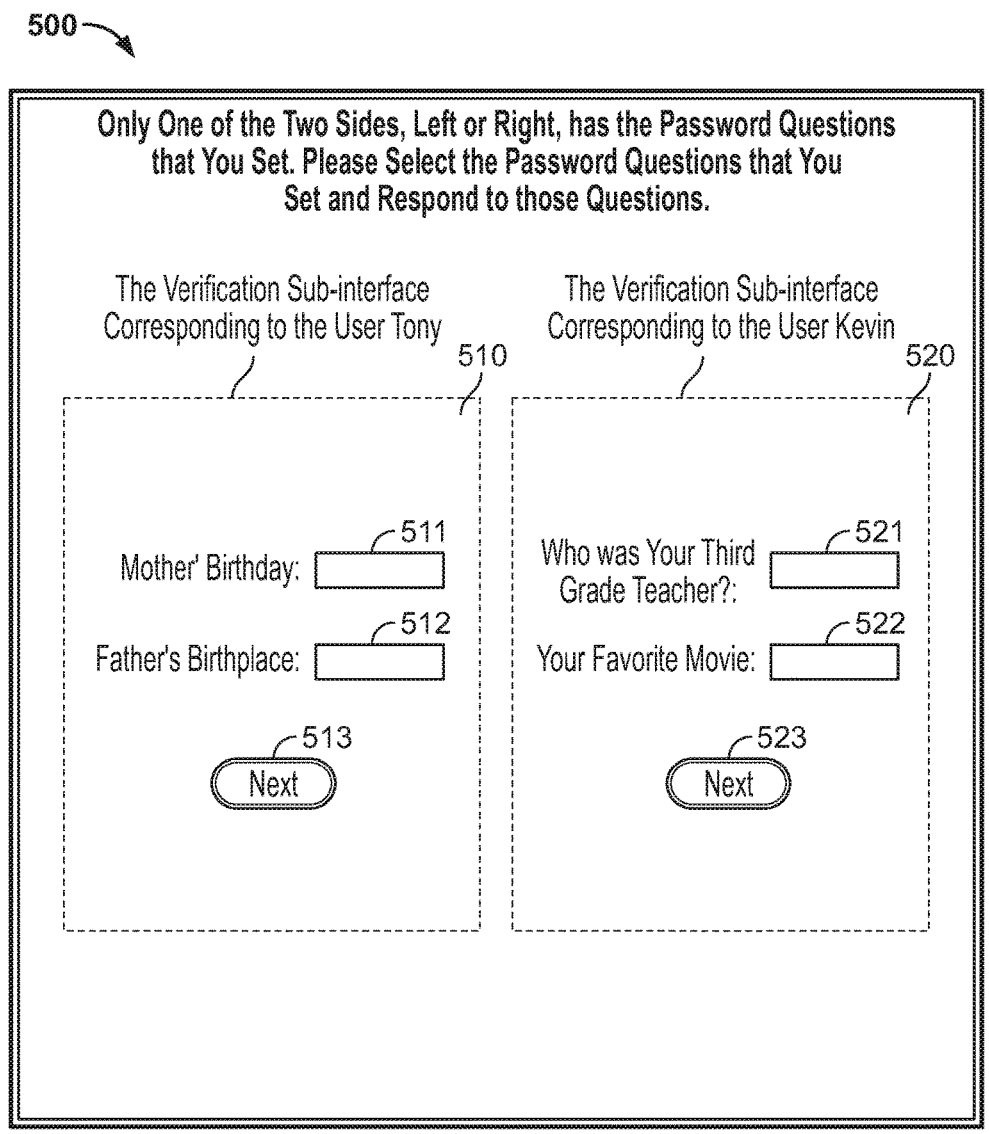
FIG. 5 is a diagram of an interface related to login password retrieval according to various embodiments of the present application.

FIG. 5 is a diagram of an interface related to login password retrieval according to various embodiments of the present application.

Referring to FIG. 5, an interface 500 displayed in connection with a process for login password retrieval is provided. In some embodiments, the interface 500 is implemented by the user account management device 100 of FIG. 1. In some embodiments, the interface 500 is implemented in connection with method 200 of FIG. 2. In some embodiments, the interface 500 is implemented in connection with method 400 of FIG. 4. In some embodiments, the interface 500 is implemented in system 600 of FIG. 6. For example, the interface 500 can be displayed by the terminal 610.

The interface 500 can include a first verification sub-interface 510 corresponding to the second user (Tony) and a second verification sub-interface 520 corresponding to the first user (Kevin). The first verification sub-interface 510 can include a first verification field 511, a second verification field 512, and a submit field 513 (e.g., a button) by which the verification process can be advanced. The second verification sub-interface 520 can include a first verification field 521, a second verification field 522, and a submit field 523 (e.g., a button) by which the verification process can be advanced.

Referring back to FIG. 1, the user management device 100 can include a password retrieval module 129. The password retrieval module 129 can, upon receiving a user password retrieval request, determine whether the login name main part used by the user corresponds to multiple account records in the account table. In the event that the login name main part corresponds to multiple account records in the account table, then the server (e.g., the password retrieval module 129) can send to the user a selective retrieval validation interface, such as interface 500. In some embodiments, the selective retrieval validation interface (e.g., interface 500) comprises verification options corresponding to a plurality of the multiple account records. For example, the selective retrieval validation interface can comprise verification options corresponding to each of the multiple account records. Upon determining that a verification option corresponding to any one account has been successfully validated, a password reset interface for the account is sent to the current user. In some embodiments, each verification option is a verification option unrelated to the login name.

As an example, assume that either the second user (Tony) forgot the login password associated with the second user or the first user (Kevin) forgot the login password associated with the first user. The user that forgot the corresponding login password associated with that user can submit a password retrieval request. The password retrieval request can be submitted on the corresponding page (e.g., a web page, a page provided within the application, or the like). According to the traditional practice, the user can be required to input the mobile phone number of the user on the interface. However, assuming that the mobile phone number of the user is 18611180751, because the mobile phone number 18611180751 is being simultaneously used by the second user (Tony) and the first user (Kevin), the server (e.g., the application system) is unable to determine which user is requesting retrieval of the password. In other words, if more than one user account is associated with a particular user identifier, and the user identifier is used in connection with identifying an account associated with a password retrieval request, the server is unable to determine which of the user accounts is associated with, or otherwise submits, the password retrieval request. In some embodiments, the mobile phone number is avoided (e.g., disregarded for purposes of password retrieval), and the user instead is allowed to confirm his identity by inputting in a linked mail box (e.g., an email address of the user), or other information. However, some users might not have a linked mail box. The use of providing password retrieval using an alternative identification field or alternative means of communication lacks sufficiently broad applicability. In some embodiments, the second user (Tony) or the first user (Kevin) can be required to solve the problem associated with password retrieval through a manual customer service (e.g., the user can be required to contact a help desk). However, such manual customer service to provide password retrieval has an adverse effect on user experience and is not cost feasible.

In some embodiments, password retrieval is not resolved by sending a verification notice to the mobile phone number or other means of communication associated with the user identifier because another user can be contacted via the verification notice and the other user can reset the intended user's password. For example, the password retrieval module 129 of the user management device 100 will not verify the user by sending a verification notice to 18611180751 because such a verification process could lead to the second user (Tony) resetting the login password of the first user (Kevin), or could lead to the first user (Kevin) resetting the login password of the second user (Tony).

Referring to FIG. 5, an interface 500 can be provided to the user for password retrieval. In some embodiments, the interface 500 corresponds to a selective retrieval validation interface. As an example, the password retrieval module 129 can generate the selective retrieval validation interface. The selective retrieval validation interface can comprise verification options corresponding to the one or more users. For example, the selective retrieval validation interface can comprise verifications corresponding to the second user (Tony) and the first user (Kevin). The selective retrieval validation interface can be provided to the current user. For example, the current user can be redirected to a page that comprises the selective retrieval validation interface. The page comprising the selective retrieval validation interface can be a web page, a page within the application, or the like.

In some embodiments, various verification options can be provided in one menu because each user generally knows the user's own verification options (e.g., password questions or password question combinations). In consideration of the possibility a user may forget the verification options (e.g., questions that the user originally set such as at registration of the user with the application), the user can be provided with an interface corresponding to the user account. In some embodiments, the selective retrieval validation interface includes a verification sub-interface corresponding to the user account (e.g., referring to FIG. 5, a first verification sub-interface 510 corresponding to the second user (Tony) and a second verification sub-interface 520 corresponding to the first user (Kevin)). Each user's verification options are provided in the user's respective sub-interface. For example, the verification options for the first user are provided in the second sub-interface 520 corresponding o the first user. In some embodiments, the current user can choose to complete verification in any verification sub-interface provided to the current user. By the same principle, in the case of a main account and a sub-account using one mobile phone number, password retrieval processing can employ the process flow described above.

Referring to FIG. 5, assume that the verification sub-interface on the left (e.g., a first verification sub-interface 510) corresponds to an account for the second user (Tony) and that the verification sub-interface on the right (e.g., a second verification sub-interface 520) corresponds to an account for the first user (Kevin). In the event that the second user (Tony) corresponds to the current user, then the current user will complete the verification options provided in the first verification field 511 and the second verification field 512 (e.g., the "Mother's birthday" and "Father's birthplace"). The second user will be very unlikely to be able to complete the verification options provided in the first verification field 521 and the second verification field 522 of the second verification sub-interface 520 because the verification options provided in the sub-interface on the right do not correspond to the verifications options associated with the second user (Tony). In the opposite case, in the event that the first user (Kevin) corresponds to the current user, then the current user will complete the verification options provided in the first verification field 521 and the second verification field 522 of the second verification sub-interface 520 (e.g., "Who was your third grade teacher?" and "Your favorite movie?").

In some embodiments, the verification options can, in addition to being password questions or password question combinations, be other forms of verification. The present application imposes no special restrictions on the type or manner of the verification options. In some embodiments, the verification options of two or more conflicting users (e.g., two or more users corresponding to a same user identifier or other login name) are provided on the same page. For example, the server can classify and list multiple verification options of login name conflicting users on the same page. This approach generally does not affect password retrieval carried out by the current user through operation of verification options. In fact, so long as the user operates a verification option under any verification sub-interface and the verification is successful, the server (e.g., the application system) can determine the account record corresponding to the current user. In some embodiments, each account record generally has one or more corresponding verification options (e.g., if the user performed the appropriate setting during registration).

As stated earlier, the login name field associated with a user that is included in the account table can include a conflict identification parameter or a relational identification parameter. In some embodiments, the conflict identification parameter does not conflict with the relational identification parameter. In some embodiments, a character selection for each type of parameter and a corresponding position for each type of parameter can be defined. For example, the conflict identification parameter can be associated with a defined first character selection and a first corresponding character position. As another example, the relational identification parameter can be associated with a defined second character selection and a second corresponding character position. Referring to Table 5, the selected character for the conflict identification parameter can be "R," and the position of the selected character for the conflict identification parameter can be to the right of the separator character "|." In contrast, the selected character for the relational identification parameter can be "T," and the position of the selected character for the relational identification parameter can be to the right of the conflict identification parameter "R." Various embodiments can use other data formats and definitions that suit actual business application needs. In some instances, thrice-issued numbers may occur or a system may permit users to create multiple related sub-accounts based on one main account. In such instances, one conflict identification parameter is generally not sufficient to resolve the problems associated with twice-issued user identifiers. In some embodiments, a string including a random number of several characters can be added after the identification parameters in the corresponding field (e.g., the login name field). The string of a random number of several characters can differentiate multiple accounts associated with a single user identifier (e.g., login name main part). In some embodiments, identification parameters are introduced for the sake of convenience into a conventional account (e.g., an account that is not a conflicting old user account or a sub-account). For example, referring to Table 5, the character "A" can be used to indicate a normal account. As provided in Table 5, "13900100110|A987688ab" represents a normal account. However, "18611180751|Rkttdihss" represents a conflicting old user. Further, as provided in Table 5, "13988888888|RT0208adkz" represents a conflicting old user. Additionally, the user account for which the login name field is "13988888888|RT0208adkz" is also a sub-account of another user (e.g., because the string included in the field includes a character "R" and a character "T after the separator character).

TABLE 5

| Sequential number | Field 1<br>Login name + Separator character +<br>Identification factor | Field 2<br>Login password |
|---|---|---|
| 1 | 13900100110\|A987688ab | aaaaaa |
| 2 | 18611180751\|Rkttdihss | bbbbbb |
| 3 | 18611180751\|Aktsd098 | cccccc |
| 4 | 13988888888\|R36derdd | aaaaaa |
| 5 | 13988888888\|RT0208adkz | dddddd |
| 6 | 13988888888\|A9963tyf | Eeeeee |
| ... | ... | ... |

Figure 6:
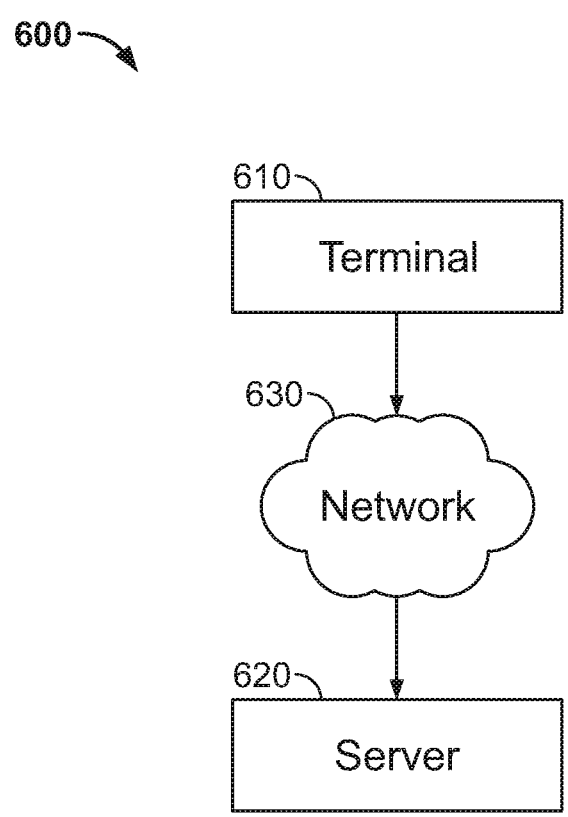
FIG. 6 is a structural block diagram of a system for user account management according to various embodiments of the present application.

FIG. 6 is a structural block diagram of a system for user account management according to various embodiments of the present application.

Referring to FIG. 6, a system 600 for user account management is provided. In some embodiments, the system 600 can implement the method 200 of FIG. 2. In some embodiments, the system 600 can implement the method 400 of FIG. 4. In some embodiments, the system 600 can implement the interface 300 of FIG. 3A, the interface 350 of FIG. 3B, or the interface 360 of FIG. 3C. In some embodiments, the system 600 can implement the interface 500 of FIG. 5.

The system 600 can include a terminal 610 and a server 620. In some embodiments, the system 600 includes a network 630 over which the terminal 610 and the server 620 can communicate. In some embodiments, the terminal 610 logs into the server 620. For example, the server 620 can host an application or an application system to which the terminal (e.g., a current user) logs in.

The terminal 610 can receive an interface or page from the server 620. In the event that the terminal 610 receives an interface or page from the server 620, the terminal 610 can display the interface to a user. The terminal 610 can receive an input (e.g., entry of information such as a user identifier, a login name main part, a login password, or the like) from a user. The terminal 610 can communicate information such as the user identifier and the login password to the server 620. For example, the terminal 610 can communicate the login name and the login password to the server 620 in connection with a registration request, an access request, or the like.

The server 620 can authenticate a terminal 610 (e.g., a user). For example, the server 620 can receive login information (e.g., login name, login password, or the like) from the terminal 610. In response to the receipt of the login information, the server 620 can authenticate the terminal, provide access to an application or application system, or the like.

In some embodiments, the server 620 can manage user accounts. For example, the server 620 can manage user accounts associated with an application or application system. The server 620 can store and update user records to a database (e.g., an account table) or the like.

In some embodiments, the server 620 can be used to implement the method 200 of FIG. 2. In some embodiments, the server 620 can be used to implement the method 400 of FIG. 4.

Figure 7:
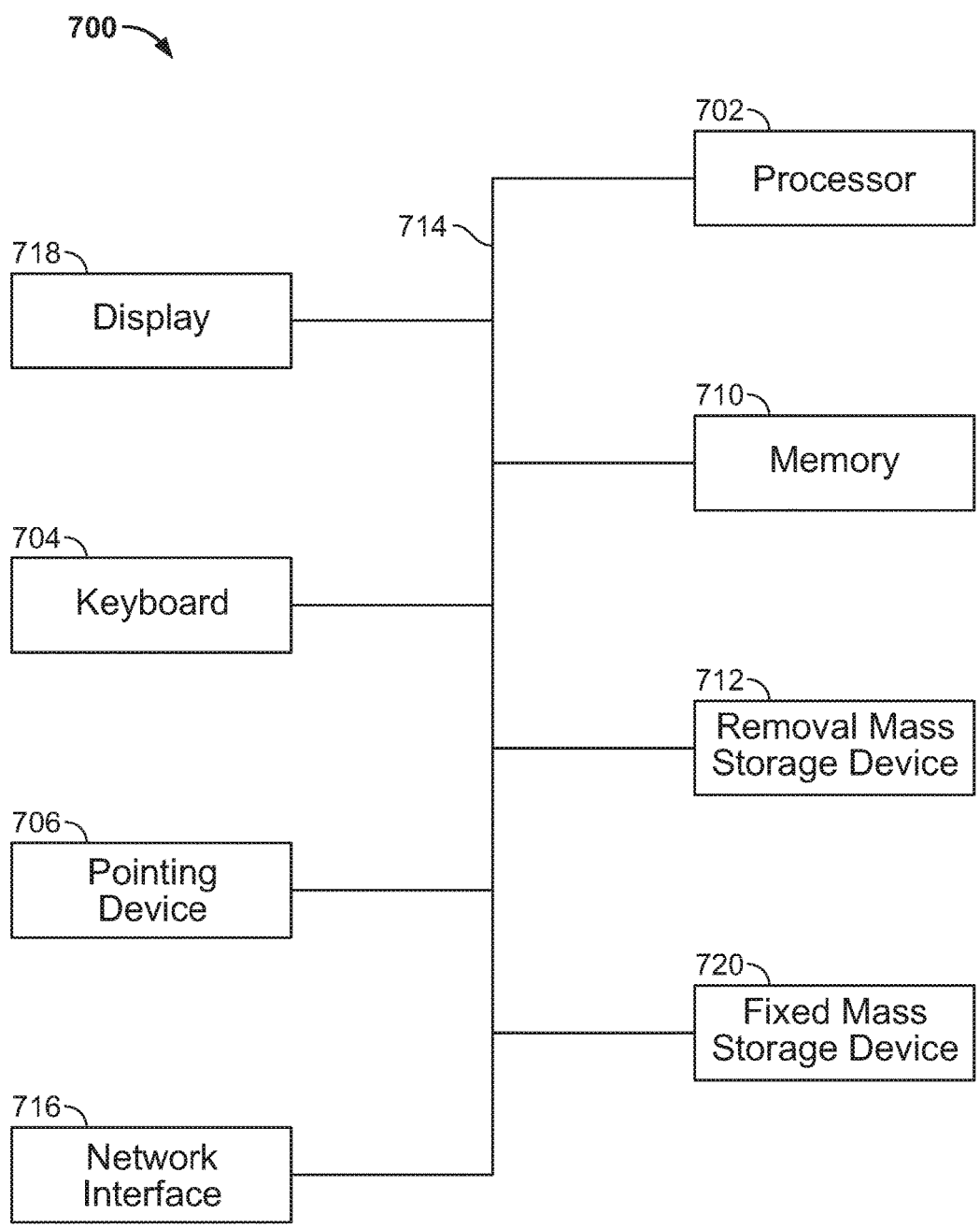
FIG. 7 is a functional diagram of a computer system for operating a simulation system of objects according to various embodiments of the present disclosure.
Figure 5:
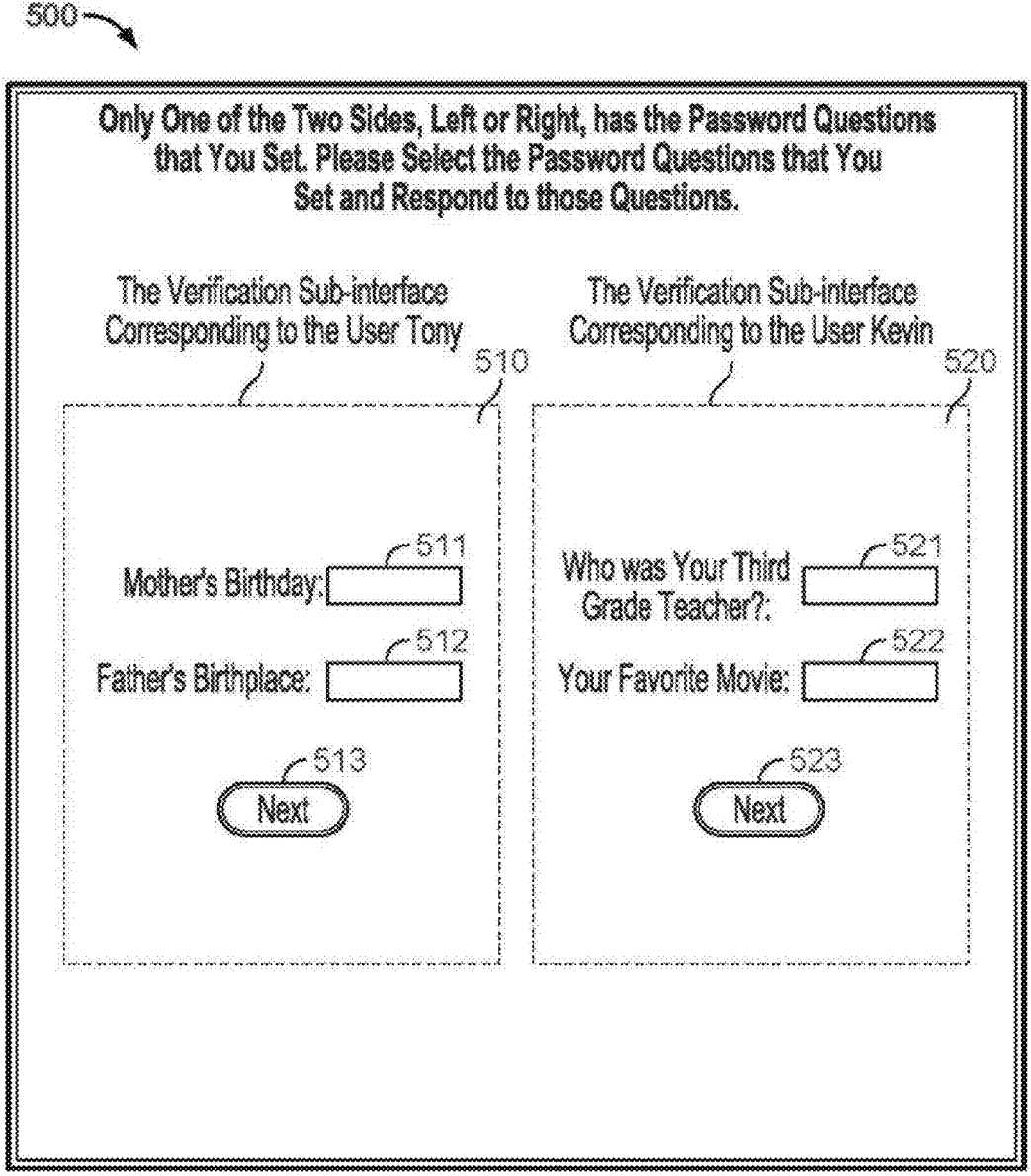

FIG. 7 is a functional diagram of a computer system for operating a simulation system of objects according to various embodiments of the present disclosure.

Referring to FIG. 7, a computer system 700 for accessing a website or for determining whether a terminal accessing the website is a mobile terminal is provided. As will be apparent, other computer system architectures and configurations can be used to implement video calls. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage device 712 and fixed mass storage 720 generally store additional programming instructions, data, and the like that typically are not in active use by the processor 702. It will be appreciated that the information retained within mass storage device 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

The modules described above can be implemented as software components executing on one or more general purpose processors, as hardware such as programmable logic devices, and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

In one typical configuration, computation equipment such as a server comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, read-only compact disk read-only memory (CD-ROM), digital multi-function optical disks (DVD), cassette-type magnetic tapes, magnetic tape and magnetic disk storage, or other magnetic storage equipment, or any other non-transmitting medium may be used to store information accessible by computer equipment. As defined in this document, computer-readable media does not include temporary computer-readable media, (transitory media), such as modulated data signals and carrier waves.

Please also note that the term "comprise" or "contain" or any of their variants are to be taken in their non-exclusive sense. Thus, processes, methods, merchandise, or equipment that comprises a series of elements not only comprises those elements, but also comprises other elements that have not been explicitly listed or elements that are intrinsic to such processes, methods, merchandise, or equipment. In the absence of further limitations, elements that are limited by the phrase "comprises a(n) . . . " do not exclude the existence of additional identical elements in processes, methods, merchandise or equipment that comprises said elements.

The above-described are merely preferred embodiments of the present application and do not serve to limit the present application. Any modifications, equivalent substitutions, or improvements that are performed shall be contained within the protective scope of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving a registration request from a current user, wherein the registration request comprises a login name main part;
   determining, in a database, whether a conflicting old user exists, wherein the conflicting old user corresponds to another user that has a conflicting login name main part that is the same as the login name main part received in connection with the registration request;
   in the event that the conflicting old user exists, executing a login password differentiation process that requires the current user to register a different login password that is different from a login password associated with the conflicting old user, wherein the login password differentiation process includes determining a login password rule for the registration request from the current user based at least in part on the login password associated with the conflicting old user; and
   storing the different login password to the database in connection with a registration of the current user.

2. The method of claim 1, wherein the determining whether the conflicting old user exists comprises searching an account table that stores account records for an account associated with the login name main part received in connection with the registration request.

3. The method of claim 1, further comprising:
   in the event that the conflicting old user does not exist, creating an account record associated with the login name main part received in connection with the registration request.

4. The method of claim 1, wherein the process of login password differentiation comprises:
   receiving a login password from the current user;
   determining whether the login password from the current user satisfies the login password rule; and
   in the event that the login password received from the current user satisfies the login password rule, creating an account for the current user.

5. The method of claim 4, wherein the creating of the account for the current user comprises:
   creating a user record associated with the registration of the current user in an account table based at least in part on the login name main part and the login password received from the current user; and
   introducing a conflict identification parameter in a login name field of the login name main part of the conflicting old user.

6. The method of claim 5, wherein the introducing the conflict identification parameter in the login name field of the login name main part of the conflicting old user comprises:
   updating an account record corresponding to the conflicting old user in the account table to include the conflict identification parameter in the login name field.

7. The method of claim 1, further comprising:
   receiving a login request from a user, wherein a login name main part and a login password are received in connection with the login request;
   determining whether an account that matches the combination of the login name main part and the login password received in connection with the login request exists;
   in the event that the account associated with the login name main part and the login password exists, permitting the user to log in; and
   in the event that the account associated with the login name main part and the login password does not exist, refusing to log in the user.

8. The method of claim 1, further comprising:
   in the event that a user successfully logs in, determining whether a user account record associated with the user includes a conflict identification parameter; and
   in the event that the user account record includes the conflict identification parameter, providing a login name main part revising interface to the user.

9. The method of claim 8, wherein the login name main part revising interface guides the user to revise a login name main part associated with the user's user account record.

10. The method of claim 8, further comprising:
    receiving a revised login name main part input to the login name main part revising interface;
    determining whether a conflicting new user exists, wherein the conflicting new user corresponds to another user that has a conflicting login name main part that is the same as the revised login name main part;
    in the event that the conflicting new user exists, updating a login name field of a user account record associated with the conflicting new user so as to include a conflict identification parameter; and
    in the event that the conflicting new user does not exist, updating the login name main part in the account record of the current user using the revised login name main part.

11. The method of claim 10, wherein in the event that the conflicting new user exists, the user account record of the conflicting new user is updated so as to cause the conflicting new user to be converted to a conflicting old user and deleting a conflict identification parameter from the login name main part from the account record of the current user.

12. The method of claim 1, wherein the login password differentiation process includes a process of refuse registration guidance mode or a password rule guidance mode.

13. The method of claim 12, wherein the refuse registration mode comprises:
    determining whether the login password received in connection with the registration request from the current user is the same as a login password associated with an account of the conflicting old user; and
    in the event that the login password received in connection with the registration request is the same as the login password associated with the account of the conflicting old user, refusing registration and providing an indication that the login password received in connection with the registration request does not satisfy a security rule to the current user.

14. The method of claim 13, further comprising:
    selecting a positive integer N;
    refusing N registration requests received from the current user and providing an indication that the login password does not comply with the security rule in response to receiving each of the N registration requests;
    receiving an (N+1) registration request from the current user;
    determining whether a login password received in connection with the (N+1) registration request from the current user is the same as the login password associated with the account of the conflicting old user;

in the event that the login password received in connection with the (N+1) registration request is the same as the login password associated with the account of the conflicting old user, providing an indication that the login password received in connection with the (N+1) registration request does not satisfy the security rule; and in the event that the login password received in connection with the (N+1) registration request is not the same as the login password associated with the account of the conflicting old user, registering the current user.

15. The method of claim 12, wherein the password rule guidance mode corresponds to a length rule guidance mode, a specified character guidance mode, or a character class guidance mode.

16. The method of claim 15, wherein the length rule guidance mode comprises:
determining whether the login password received in connection with the registration request from the current user comprises a specified character;
in the event that the login password comprises the specified character, registering the user; and
in the event that the login password does not comprise the specified character, prompting the current user to input a login password that comprises the specified character, wherein the login password associated with an account of the conflicting old user does not comprise the specified character.

17. The method of claim 15, wherein the specified character guidance mode comprises:
determining whether the login password received in connection with the registration request from the current user satisfies a predetermined length rule;
in the event that the login password satisfies the predetermined length rule, registering the user; and
in the event that the login password does not satisfy the predetermined length rule, prompting the current user to input a login password that satisfies the predetermined length rule, wherein the login password associated with an account of the conflicting old user does not satisfy the predetermined length rule.

18. The method of claim 15, wherein the character class guidance mode comprises:
determining whether the login password received in connection with the registration request from the current user satisfies a predetermined character class rule;
in the event that the login password satisfies the predetermined character class rule, registering the user; and
in the event that the login password does not satisfy the predetermined character class rule, prompting the current user to input a login password that satisfies the predetermined character class rule, wherein the login password associated with an account of the conflicting old user does not satisfy the predetermined character class rule.

19. The method of claim 1, further comprising:
receiving a password retrieval request, wherein a login name main part is received in connection with the retrieval request;
determining whether multiple accounts are associated with the login name main part;
in response to determining that multiple accounts are associated with the login name main part received in connection with the retrieval request, providing, to a user from whom the password retrieval request is received, a selective retrieval validation interface, wherein the selective retrieval validation interface comprises verification options corresponding to each of the multiple accounts associated with the login name main part; and
in response to determining that a verification option corresponding to any one of the multiple accounts is successfully validated, providing a password reset interface for the validated account to the user from whom the password retrieval request is received, wherein each verification option is a verification option unrelated to the login name main part.

20. The method of claim 1, further comprising:
receiving a sub-account creation request from a user after successful user login;
pushing to the user from whom the sub-account creation request is received a sub-account creation interface;
receiving a login password input to the sub-account creation interface;
determining whether the login password input to the sub-account creation interface is the same as a login password associated with an account for which the user is currently logged in;
in the event that the login password input to the sub-account creation interface is the same, prompting the user to re-input the login password; and
in the event that the login password input to the sub-account creation interface is not the same, creating a sub-account based on the login name main part of the currently logged in account and the login password input to the sub-account creation interface by the user, and adding a relational identification parameter to a sub-account login name field.

21. The method of claim 1, wherein a login name field of an account table that stores user accounts comprises a login name main part, a random character string and a separator character, wherein a conflict identification parameter is located between the login name main part and the random character string, and wherein the separator character is located between the conflict identification parameter and the login name main part.

22. A device comprising:
at least one processor configured to:
receive a registration request from a current user, wherein the registration request comprises a login name main part;
determine whether a conflicting old user exists in a database, wherein the conflicting old user corresponds to another user that has a conflicting login name main part that is the same as the login name main part received in connection with the registration request;
in the event that the conflicting old user exists, execute a password differentiation process that requires the current user to register a different login password that is different from a login password associated with the conflicting old user, wherein the login password differentiation process includes determining a login password rule for the registration request from the current user based at least in part on the login password associated with the conflicting old user; and
store the different login password to the database in connection with a registration of the current user; and a memory coupled to the at least one processor and configured to provide the at least one processor with instructions.

23. A computer program product for generating a transaction, the computer program product being embodied in a non-transitory computer readable storage medium and comprising computer instructions for:
receiving a registration request from a current user, wherein the registration request comprises a login name main part;
determining whether a conflicting old user exists, wherein the conflicting old user corresponds to another user that has a conflicting login name main part that is the same as the login name main part received in connection with the registration request;
in the event that the conflicting old user exists, executing a login password differentiation process that requires the current user to register a different login password that is different from a login password associated with the conflicting old user, wherein the login password differentiation process includes determining a login password rule for the registration request from the current user based at least in part on the login password associated with the conflicting old user; and
storing the different login password to a database in connection with a registration of the current user.

24. The method of claim 1, wherein the login password rule includes one or more requirements for the different login password to be registered in connection with the registration request from the current user.

25. The method of claim 1, wherein the determining the login password rule comprises determining one or more criteria for ensuring that the different login password is different from the login password associated with the conflicting old user.

26. The method of claim 25, wherein the login password differentiation process requires that the different login password satisfies the one or more criteria for ensuring that the different login password is different from the login password associated with the conflicting old user.

* * * * *

UNITED STATES PATENT AND TRADEMARK OFFICE
CERTIFICATE OF CORRECTION

Page 1 of 2

PATENT NO. : 9,811,655 B2
APPLICATION NO. : 14/703604
DATED : November 7, 2017
INVENTOR(S) : Qian et al.

It is certified that error appears in the above-identified patent and that said Letters Patent is hereby corrected as shown below:

In the Drawings

In Figure 5, field 511, insert --s-- after Mother'. (see attached sheet)

Signed and Sealed this
Nineteenth Day of June, 2018

Andrei Iancu
*Director of the United States Patent and Trademark Office*